United States Patent [19]

Nagami et al.

[11] Patent Number: 6,167,051

[45] Date of Patent: Dec. 26, 2000

[54] NETWORK NODE AND METHOD OF PACKET TRANSFER

[75] Inventors: Kenichi Nagami, Chiba-ken; Hisako Tanaka, Tokyo; Yasuhiro Katsube, Kanagawa-ken, all of Japan

[73] Assignee: Kabushiki Kaisha Toshiba, Kawasaki, Japan

[21] Appl. No.: 08/891,447

[22] Filed: Jul. 10, 1997

[30] Foreign Application Priority Data

Jul. 11, 1996 [JP] Japan ................................. 8-181803

[51] Int. Cl.[7] ................................................. H04L 12/28
[52] U.S. Cl. ........................................... 370/397; 370/395
[58] Field of Search ................................. 370/395, 397, 370/398, 400, 401, 232, 235, 410, 409, 411, 399

[56] References Cited

U.S. PATENT DOCUMENTS

| | | | |
|---|---|---|---|
| 5,420,862 | 5/1995 | Perlman | 370/401 |
| 5,463,621 | 10/1995 | Suzuki | 370/399 |
| 5,500,860 | 3/1996 | Perlman | 370/401 |
| 5,502,816 | 3/1996 | Gawlick | 370/409 |
| 5,511,168 | 4/1996 | Perlman | 370/409 |
| 5,519,836 | 5/1996 | Gawlick | 370/409 |
| 5,544,152 | 8/1996 | Obermanns | 370/409 |
| 5,612,959 | 3/1997 | Takase | 370/390 |
| 5,633,869 | 5/1997 | Burnett | 370/396 |
| 5,787,071 | 7/1998 | Basso | 370/231 |
| 5,796,740 | 8/1998 | Perlman | 370/401 |

FOREIGN PATENT DOCUMENTS

| | | |
|---|---|---|
| 0719066 | 6/1996 | European Pat. Off. . |
| 2273224 | 6/1994 | United Kingdom . |

OTHER PUBLICATIONS

Minfa Huang et al., "Two Multiparty Connection Establishment Procedures for Broadband ISDN," Proceedings of the Network Operations and Management Symposium (Noms), IEEE, New York, pp. 373–382, (Jan. 1, 1992).

Gaddis et al., "A Call Model for Multipoint Communication in Switched Networks," Proceedings of the International Conference on Communications, IEEE, New York, pp. 609–615, Jun. 14, 1992).

Kim, S., "A Strategy to Support MCS Over Native ATM Service," Proceedings of the Southeast Conference (Southeastcon), IEEE, New York, pp. 582–585, Apr. 11, 1996).

Katsube et al.; "Router Architecture Extensions for ATM : Overview" Internet Engineering Task Force, Internet Draft, Mar. 25, 1997; pp. 1–19.

M. Borden et al.; "Issues for RSVP and Integrated Services over ATM" Internet Engineering Task Force, Internet Draft, Feb. 22, 1997; pp. 1–12.

*Primary Examiner*—Douglas W. Olms
*Assistant Examiner*—Ricardo M. Pizarro
*Attorney, Agent, or Firm*—Finnegan, Henderson, Farabow, Garrett & Dunner, L.L.P.

[57] ABSTRACT

A mechanism for performing multicast packet transfer when a certain one of the destination nodes participating in the multicast communication requires resource reservation for a certain packet flow specified among the packet flows to that destination node. A system may transfer multicast packets using a plurality of virtual connections based on which flow the packets to be transferred belong to, so that each node receives the packets without duplication. Alternatively, a system may selectively discard received packets to avoid processing duplicated packets, although duplicated packets are received at each node.

12 Claims, 43 Drawing Sheets

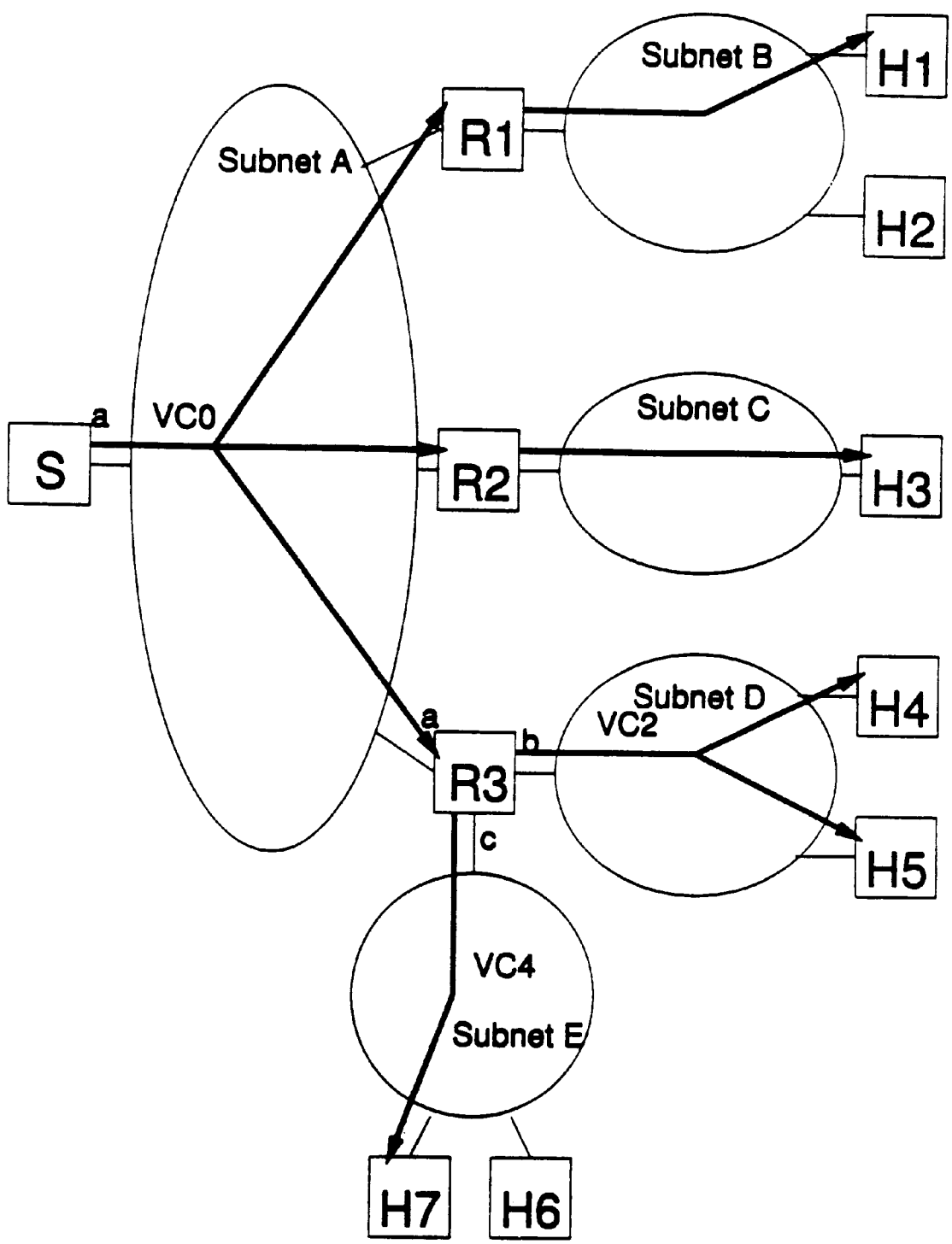
F I G. 1

| SOURCE ADDRESS | DESTINATION ADDRESS | DESTINATION PORT | | OUTPUT VC POINTER |
|---|---|---|---|---|
| S<br>S | G<br>G | -<br>1 | | 1<br>2 |

F I G. 6(a)

| ADDRESS | OUTPUT I/F | OUTPUT VC | NEXT-POINTER |
|---|---|---|---|
| 1<br>2 | a<br>a | VC0<br>VC1 | X<br>X |

F I G 6(b)

| SOURCE ADDRESS | DESTINATION ADDRESS | DESTINATION PORT | | OUTPUT VC POINTER |
|---|---|---|---|---|
| S<br>S | G<br>G | –<br>1 | | 1<br>3 |

FIG 7(a)

| ADDRESS | OUTPUT I/F | OUTPUT VC | NEXT-POINTER |
|---|---|---|---|
| 1<br>2<br>3<br>4 | b<br>c<br>b<br>c | VC2<br>VC4<br>VC3<br>VC4 | 2<br>X<br>4<br>X |

FIG 7(b)

| SOURCE ADDRESS | DESTINATION ADDRESS | DESTINATION PORT | OUTPUT VC POINTER |
|---|---|---|---|
| S | G | - | 1 |
| S | G | 1 | 2 |

FIG.9(a)

| ADDRESS | OUTPUT I/F | OUTPUT VC | NEXT-POINTER |
|---|---|---|---|
| 1 | a | VC0 | X |
| 2 | a | VC1 | 3 |
| 3 | a | VC2 | X |

FIG.9(b)

| SOURCE ADDRESS | DESTINATION ADDRESS | DESTINATION PORT | OUTPUT VC POINTER |
|---|---|---|---|
| S<br>S | G<br>G | –<br>1 | 1<br>3 |

FIG 10(a)

| ADDRESS | OUTPUT I/F | OUTPUT VC | NEXT-POINTER |
|---|---|---|---|
| 1<br>2<br>3<br>4<br>5 | b<br>c<br>b<br>b<br>c | VC3<br>VC6<br>VC4<br>VC5<br>VC6 | 2<br>X<br>4<br>5<br>X |

FIG 10(b)

| SOURCE ADDRESS | DESTINATION ADDRESS | DESTINATION PORT | | OUTPUT VC POINTER |
|---|---|---|---|---|
| S<br>S | G<br>G | -<br>1 | | 1<br>3 |

F I G. 12(a)

| ADDRESS | OUTPUT I/F | OUTPUT VC | NEXT-POINTER |
|---|---|---|---|
| 1<br>2<br>3<br>4 | a<br>a<br>a<br>a | VC0<br>VC1<br>VC0<br>VC2 | 2<br>X<br>4<br>X |

F I G 12(b)

| SOURCE ADDRESS | DESTINATION ADDRESS | DESTINATION PORT | | OUTPUT VC POINTER |
|---|---|---|---|---|
| S<br>S | G<br>G | -<br>1 | | 1<br>4 |

FIG.13(a)

| ADDRESS | OUTPUT I/F | OUTPUT VC | NEXT-POINTER |
|---|---|---|---|
| 1 | b | VC3 | 2 |
| 2 | b | VC4 | 3 |
| 3 | c | VC6 | X |
| 4 | b | VC3 | 5 |
| 5 | b | VC5 | 6 |
| 6 | c | VC6 | X |

FIG.13(b)

| SOURCE ADDRESS | DESTINATION ADDRESS | DESTINATION PORT | OUTPUT VC POINTER |
|---|---|---|---|
| S<br>S | G<br>G | –<br>1 | 1<br>2 |

FIG. 16(a)

| ADDRESS | OUTPUT I/F | OUTPUT VC | NEXT-POINTER |
|---|---|---|---|
| 1<br>2 | a<br>a | VC0<br>VC1 | X<br>X |

FIG 16(b)

| SOURCE ADDRESS | DESTINATION ADDRESS | DESTINATION PORT | OUTPUT VC POINTER |
|---|---|---|---|
| S | G | – | 1 |
| S | G | 1 | 3 |

F I G. 18(a)

| ADDRESS | OUTPUT I/F | OUTPUT VC | NEXT-POINTER |
|---|---|---|---|
| 1 | b | VC2 | 2 |
| 2 | c | VC4 | X |
| 3 | b | VC3 | X |

F I G. 18(b)

| SOURCE ADDRESS | DESTINATION ADDRESS | DESTINATION PORT | | INPUT I/F | INPUT VC |
|---|---|---|---|---|---|
| S | G | 1 | | a | VC1 |
F I G. 19
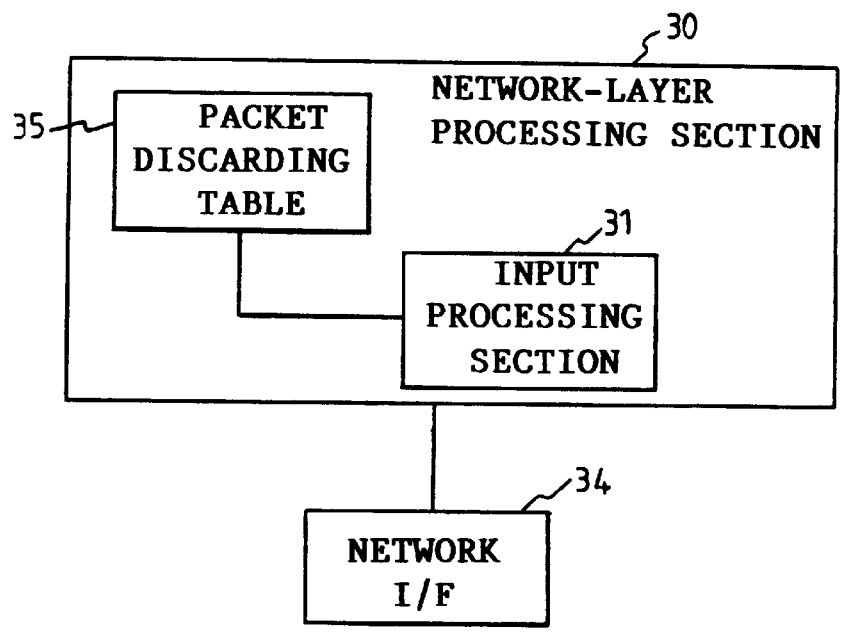
F I G. 20

| INPUT I/F | INPUT VC | OUTPUT VC POINTER |
|---|---|---|
| a | VC0 | 1 |
| a | VC1 | 2 |
| a | VC2 | 4 |

FIG. 26(a)

| ADDRESS | OUTPUT I/F | OUTPUT VC | NEXT-POINTER |
|---|---|---|---|
| 1 | UPPER LAYER | – | X |
| 2 | b | VC4 | 3 |
| 3 | UPPER LAYER | – | X |
| 4 | b | VC5 | 5 |
| 5 | c | VC7 | X |

FIG 26(b)

| SOURCE ADDRESS | DESTINATION ADDRESS | DESTINATION PORT | OUTPUT VC POINTER |
|---|---|---|---|
| S | G1 | – | 1 |
| S | G1 | 1 | 3 |
| S | G2 | – | 5 |

FIG. 27(a)

| ADDRESS | OUTPUT I/F | OUTPUT VC | NEXT-POINTER | DIRECT-LINK |
|---|---|---|---|---|
| 1 | b | VC3 | 2 | no |
| 2 | c | VC6 | X | no |
| 3 | b | VC4 | 4 | yes |
| 4 | c | VC6 | X | no |
| 5 | b | VC5 | 6 | yes |
| 6 | c | VC7 | X | yes |

FIG. 27(b)

| INPUT VC | FLOW | | |
| --- | --- | --- | --- |
| | SOURCE ADDRESS | DESTINATION ADDRESS | DESTINATION PORT |
| VC1 | S | G1 | 1 |
| VC2 | S | G2 | - |

F I G. 28

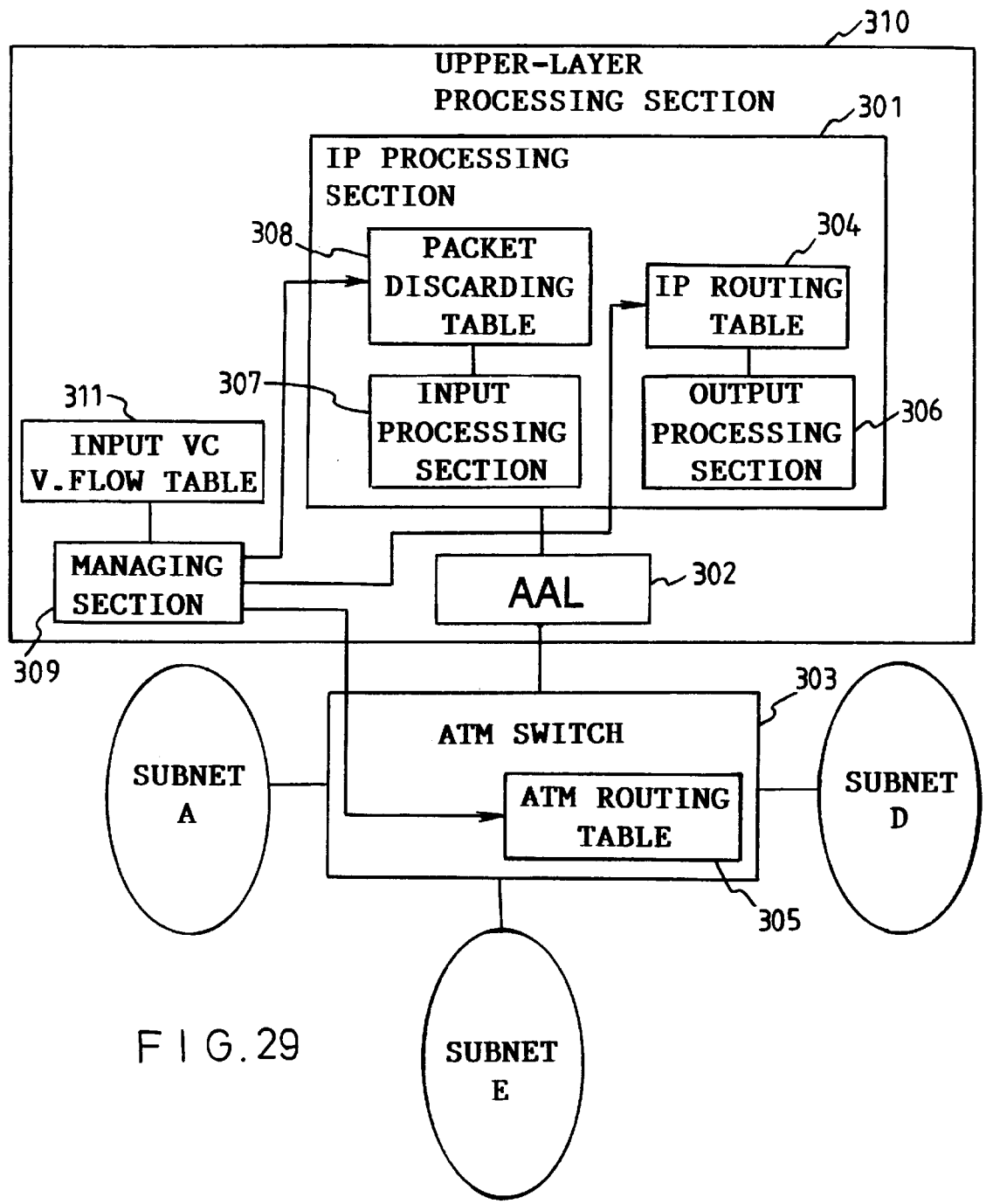
F I G. 29

| INPUT I/F | INPUT VC | OUTPUT VC POINTER |
|---|---|---|
| a | VC0 | 1 |
| a | VC1 | 2 |
| UPPER LAYER | VC2 | 4 |
| UPPER LAYER | VC4 | 5 |

FIG. 31(a)

| ADDRESS | OUTPUT I/F | OUTPUT VC | NEXT-POINTER |
|---|---|---|---|
| 1 | UPPER LAYER | VC0 | X |
| 2 | b | VC3 | 3 |
| 3 | UPPER LAYER | VC1 | X |
| 4 | b | VC2 | X |
| 5 | c | VC4 | X |

FIG 31(b)

| SOURCE ADDRESS | DESTINATION ADDRESS | DESTINATION PORT | OUTPUT VC POINTER |
|---|---|---|---|
| S | G | - | 1 |

FIG. 32(a)

| ADDRESS | OUTPUT I/F | OUTPUT VC | NEXT-POINTER |
|---|---|---|---|
| 1 | UPPER LAYER | VC2 | 2 |
| 2 | UPPER LAYER | VC4 | X |

FIG. 32(b)

PACKET DISCARDING TABLE

| SOURCE ADDRESS | DESTINATION ADDRESS | DESTINATION PORT | | INPUT VC |
|---|---|---|---|---|
| S | G | 1 | | VC1 |

FIG 33(a)

INPUT VC V.FLOW TABLE

| INPUT VC | FLOW | | |
|---|---|---|---|
| | SOURCE ADDRESS | DESTINATION ADDRESS | DESTINATION PORT |
| VC1 | S | G | 1 |

FIG. 33(b)

IP ROUTING TABLE

| SOURCE ADDRESS | DESTINATION ADDRESS | DESTINATION PORT | | OUTPUT VC POINTER |
|---|---|---|---|---|
| S | G1 | - | | 1 |
| S | G1 | 1 | | 3 |

FIG. 35(a)

| ADDRESS | OUTPUT I/F | OUTPUT VC | NEXT-POINTER | DIRECT-LINK |
|---|---|---|---|---|
| 1 | b | VC2 | 2 | no |
| 2 | c | VC4 | X | no |
| 3 | b | VC2 | 4 | yes |
| 4 | b | VC3 | 5 | no |
| 5 | c | VC4 | X | no |

FIG 35(b)

PACKET DISCARDING TABLE

| SOURCE ADDRESS | DESTINATION ADDRESS | DESTINATION PORT | | INPUT VC |
|---|---|---|---|---|
| | | | | |

FIG 35(c)

INPUT VC V.FLOW TABLE

| INPUT VC | FLOW | | | DIRECT -LINK |
| | SOURCE ADDRESS | DESTINATION ADDRESS | DESTINATION PORT | |
|---|---|---|---|---|
| VC1 | S | G | 1 | yes |

FIG. 35(d)

IP ROUTING TABLE

| SOURCE ADDRESS | DESTINATION ADDRESS | DESTINATION PORT | OUTPUT VC POINTER |
|---|---|---|---|
| S | G1 | - | 1 |
| S | G1 | 1 | 3 |

FIG. 37(a)

| ADDRESS | OUTPUT I/F | OUTPUT VC | NEXT-POINTER | DIRECT-LINK |
|---|---|---|---|---|
| 1 | b | VC2 | 2 | no |
| 2 | c | VC4 | X | no |
| 3 | b | VC2 | 4 | no |
| 4 | b | VC3 | 5 | no |
| 5 | c | VC4 | X | no |

FIG 37(b)

PACKET DISCARDING TABLE

| SOURCE ADDRESS | DESTINATION ADDRESS | DESTINATION PORT | INPUT VC |
|---|---|---|---|
| S | G | 1 | VC1 |

FIG 37(c)

INPUT VC V.FLOW TABLE

| INPUT VC | FLOW | | | DIRECT -LINK |
| | SOURCE ADDRESS | DESTINATION ADDRESS | DESTINATION PORT | |
|---|---|---|---|---|
| VC1 | S | G | 1 | no |

FIG.37(d)

| SOURCE ADDRESS | DESTINATION ADDRESS | DESTINATION PORT | INPUT I/F | INPUT VC | OUTPUT VC POINTER |
|---|---|---|---|---|---|
| S | G | – | a | VC0 | 1 |

FIG. 39(a)

| ADDRESS | OUTPUT I/F | OUTPUT VC | NEXT POINTER |
|---|---|---|---|
| 1 | b | VC1 | 2 |
| 2 | c | VC2 | X |

FIG. 39(b)

| INPUT I/F | INPUT VC | OUTPUT VC POINTER |
|---|---|---|
| a | VC0 | 1 |

FIG 40(a)

| ADDRESS | OUTPUT I/F | OUTPUT VC | NEXT-POINTER |
|---|---|---|---|
| 1 | b | VC1 | 2 |
| 2 | c | VC2 | X |

FIG 40(b)

| SOURCE ADDRESS | DESTINATION ADDRESS | DESTINATION PORT | OUTPUT VC POINTER |
|---|---|---|---|
| S | G | - | 1 |

FIG. 42(a)

| ADDRESS | OUTPUT I/F | OUTPUT VC | NEXT-POINTER |
|---|---|---|---|
| 1 | d | VC3 | X |

FIG. 42(b)

| INPUT I/F | INPUT VC | OUTPUT VC POINTER |
|---|---|---|
| a | VC0 | 1 |
| d | VC3 | 2 |

FIG 43(a)

| ADDRESS | OUTPUT I/F | OUTPUT VC | NEXT-POINTER |
|---|---|---|---|
| 1 | UPPER LAYER | — | X |
| 2 | b | VC1 | 2 |
| 3 | c | VC2 | X |

FIG. 43(b)

NETWORK NODE AND METHOD OF PACKET TRANSFER

BACKGROUND OF THE INVENTION

A. Field of the Invention

The present invention relates to a router that connects virtual-connection-oriented networks and a method whereby multicast packets are transferred to a different logical network through a router.

B. Description of the Background Art

A router is employed in connecting logical networks; it performs the function of transferring packets from one logical network to another logical network. A packet, in addition to containing communication information data that is to be transferred, contains network layer addresses of its source and final destination. Using the destination address, the router determines the output interface of the packet and the next-hop node to which the packet is to be transferred.

Such a router device, in addition to providing unicast communication in which packets are transferred from one source node to one final destination node, is also capable of multicast communication, in which packets are sent from a single source to a plurality of destination nodes.

In recent years, resource reservation at the router has been used when audio and/or pictures are transferred using packets. Transferring audio/pictures and other data without resource reservation results in broken audio and corrupt video. The resource reservation technique is useful not only in transferring information which requires a certain desired transfer rate, such as audio and pictures, but also in transferring high priority data.

In order to perform resource reservation at the router, resource reservation information is exchanged between nodes, including routers. One protocol currently being developed for resource reservation, RSVP (Resource reservation Protocol), applies to both unicast and multicast.

In RSVP, resource reservation is performed from a destination node to a source node. Specifically, a PATH message is sent from node to node along a path in a direction flowing from the source node to the destination node. Routers along this path store information regarding the path on which the data is to be transferred based on the PATH message. This PATH message contains an identifier specifying the packet flow for which the resource reservation is to be performed and an IP address of the node that sent the PATH message.

When the destination node receives the PATH message, it makes its request for resource reservation by sending an RESV message upstream, back to the source node in response to the PATH message. This RESV message contains an identifier specifying the packet flow for which resources are to be reserved. In RSVP, for example, this identifier is called Flow ID. The RESV message also contains a quality of service (QOS) requested by the destination node.

When a router receives the RESV message, it determines whether its network-layer (e.g., Internet Protocol (IP)) processing section has sufficient capacity for this resource reservation. If so, the router performs network-layer scheduling to reserve the resources and transfers the RESV message upstream. If not, the router sends an RESV_ERROR message downstream. This procedure is repeated until the RESV message reaches the source node, thereby completing the resource reservation.

If a Local Area Network (LAN) constituting a logical network is implemented by a virtual-connection-oriented network, and resource reservation is effected in multicast communication in response to a request from a certain receiving (destination) node, resource reservation within the LAN can be implemented by creating one point-multipoint virtual connection (VC) with resource reservation for one multicast address and also creating another "best effort" point-multipoint VC (i.e., with no resource reservation) for the same multicast address.

For example, when sending a multicast packet of destination address G to receiving (destination) nodes H1, H2, H3 and H4 from sending (source) node S, if H1 and H2 have requested QOS but H3 and H4 have not requested QOS, there are set up a point-multipoint VC with the requested QOS for destination address G to H1, H2 from S and another "best effort" point-multipoint VC for destination address G to H3, H4 from S.

However, the conventional technology has not considered a situation where a receiving node requests QOS for a specified application, like video conference, but does not request QOS for the other applications working on the identical receiving node.

For example, if two VCs, one of which is with QOS and the other of which is "best effort", are set up to reach one downstream node and an upstream node duplicates a packet to transmit each packet through each VC because both VCs are related to the same destination address, the downstream node will receive two packets identical to each other. If the downstream node operates like above to transfer the received packets to a further downstream node, the further downstream node will receive four packets identical to one another. The number of identical packets is doubled every time the multicast tree is traced.

Another recently developed technique for transferring packets at a higher rate is a Cell Switched Router (CSR). This is a particular type of router that has a datalink-layer switch to transfer packets in addition to a network-layer processing section (an ordinary router software for packet forwarding). This technology makes it possible for a router to transfer packets at a layer lower than the network layer by directly linking an input virtual connection (VC) and an output VC through the switch.

However, when this technology is applied to multicast packet transfer, packets may not be delivered to some of the receiving parties that participate in the multicast group, if the direct linking is not performed for all the receiving parties and multicast packets only flow onto the VC that is directly linked.

On the other hand, if packets flow onto two VCs, one of which is directly linked and the other of which is not directly linked (supposed to be used for hop-by-hop transfer), the above-mentioned packet duplication may occur.

SUMMARY OF THE INVENTION

It is therefore an object of the present invention to provide a mechanism for performing an efficient and adequate multicast packet transfer when a certain one of the destination nodes participating in the multicast communication requires resource reservation for a certain packet flow specified among the packet flows to that destination node.

Another object of the present invention is to provide a mechanism for performing an efficient and adequate multicast packet transfer when a router has a function for directly linking virtual connections belonging to different logical networks.

Yet another object of the present invention is to achieve high-speed packet transfer by lightening the load on the network-layer processing section when one packet is output by a router to a plurality of virtual connections.

According to one aspect of the present invention, there is provided a mechanism for transferring a packet destined for a plurality of destination nodes in multicast communication, in a network having a first node and a plurality of second nodes. The mechanism sets up a plurality of virtual connections in the network, each of the plurality of virtual connections being set up from the first node to one or more of the plurality of second nodes; and transmits a plurality of packets destined for the destination nodes from the first node using the plurality of virtual connections, so that each of the plurality of second nodes receives the plurality of packets destined for the destination nodes without duplication through one or more of the plurality of virtual connections and at least one of the plurality of second nodes receives the plurality of packets through at least two of the plurality of virtual connections.

According to another aspect of the present invention, a mechanism sets up a first virtual connection from the first node to the plurality of second nodes; sets up a second virtual connection from the first node to at least a specified one of the plurality of second nodes; transmits a plurality of packets from the first node, so that each of the plurality of second nodes receives the packets destined for the destination nodes through the first virtual connection and at least the specified one of the plurality of second nodes receives the packets destined for the destination nodes and belonging to a specified flow also through the second virtual connection; and discards the packets destined for the destination nodes and belonging to the specified flow received through the first virtual connection at the specified node.

According to yet another aspect of the present invention, there is provided a mechanism for transferring a packet from a first node belonging to one logical network to a second node belonging to another logical network, comprising: a memory for storing a correspondence relationship between a first virtual connection for receiving a packet from the first node and a second virtual connection for transmitting the packet to the second node; first means for transferring a packet received from the first node to a next-hop node determined by analyzing a destination address contained in the packet; second means for transferring a packet destined for a plurality of destination nodes in multicast communication received through the first virtual connection onto the second virtual connection in accordance with the correspondence relationship, when the correspondence relationship is stored in the memory; and means for copying the packet received through the first virtual connection to hand over the packet to the first means, when it is determined that the next-hop node will not receive the packet destined for the destination nodes if the packet is transferred only by the second means.

According to yet another aspect of the present invention, there is provided a mechanism comprising: a memory for storing a correspondence relationship between a first virtual connection for receiving a packet from the first node and a second virtual connection for transmitting the packet to the second node; first means for transferring a packet received from the first node to a next-hop node determined by analyzing a destination address contained in the packet; second means for transferring a packet received through the first virtual connection onto the second virtual connection in accordance with the stored correspondence relationship, when the correspondence relationship is stored in the memory; and means for discarding a packet received through another virtual connection different from the first virtual connection before the packet is handed over to the first means, when the packet received through said another virtual connection is identical to the packet received through the first virtual connection.

According to yet another aspect of the present invention, there is provided a mechanism for transferring a packet destined for a plurality of destination nodes in multicast communication from a first node belonging to one logical network through a switch for exchanging the packet to a second node and a third node belonging to another logical network different from said one logical network. The mechanism stores a correspondence relationship between a first virtual connection for transferring a packet and a second virtual connection for transmitting the packet to the second node and a third virtual connection for transmitting the packet to the third node; transfers a packet received from the first node through the first virtual connection to the switch by analyzing a destination address contained in the packet; and transfers, by the switch, the packet received through the first virtual connection onto the second and third virtual connections in accordance with the stored correspondence relationship.

Other features and advantage of the present invention will be become apparent from the following description taken in conjunction with the accompanying drawings.

Both the foregoing general description and the following detailed description provide examples consistent with this invention and explain how to make and use systems and methods consistent with the invention. These description do not restrict the claimed invention.

BRIEF DESCRIPTION OF THE DRAWINGS

FIG. 1 is an exemplary network topology and ordinary virtual connections.

FIG. 6(a) and FIG. 6(b) show exemplary contents of the routing table in the sending node according to specific example 1 of embodiment 1.

FIG. 7(a) and FIG. 7(b) show exemplary contents of the routing table in the router according to specific example 1 of embodiment 1.

FIG. 9(a) and FIG. 9(b) illustrate exemplary contents of the routing table in the sending node according to specific example 2 of embodiment 1.

FIG. 10(a) and FIG. 10(b) illustrate exemplary contents of the routing table in the router according to specific example 2 of embodiment 1.

FIG. 12(a) and FIG. 12(b) illustrate exemplary contents of the routing table in the sending node according to specific example 3 of embodiment 1.

FIG. 13(a) and FIG. 13(b) illustrate exemplary contents of the routing table in the router according to specific example 3 of embodiment 1.

FIG. 16(a) and FIG. 16(b) illustrate exemplary contents of the routing table in the sending node according to embodiment 2.

FIG. 18(a) and FIG. 18(b) each illustrate exemplary contents of the routing table in the router according to embodiment 2.

FIG. 19 is exemplary contents of the packet discarding table according to embodiment 2.

FIG. 20 is a functional block diagram showing an exemplary configuration of a receiving node according to embodiment 2.

FIG. 26(a) and FIG. 26(b) each illustrate exemplary contents of the ATM routing table according to specific example 1 of embodiment 3.

FIG. 27(a) and FIG. 27(b) each illustrate exemplary contents of the IP routing table according to specific example 1 of embodiment 3.

FIG. 28 is exemplary contents of the input VC v. flow table according to specific example 1 of embodiment 3.

FIG. 29 is a functional block diagram showing an exemplary configuration of the CSR according to specific examples 2 and 3 of embodiment 3.

FIG. 31(a) and FIG. 31(b) each illustrate exemplary contents of the ATM routing table according to specific example 2 of embodiment 3.

FIG. 32(a) and FIG. 32(b) each illustrate exemplary contents of the IP routing table according to specific example 2 of embodiment 3.

FIG. 33(a) illustrates exemplary contents of the packet discarding table and FIG. 33(b) illustrates contents of the input VC v. flow table, according to specific example 2 of embodiment 3.

FIG. 35(a) and FIG. 35(b) illustrate exemplary contents of the IP routing table, FIG. 35(c) illustrates exemplary contents of the packet discarding table, and FIG. 35(d) illustrates exemplary contents of the input VC v. flow table, in said given condition according to specific example 3 of embodiment 3.

FIG. 37(a) and FIG. 37(b) illustrate exemplary contents of the IP routing table, FIG. 37(c) illustrates exemplary contents of the packet discarding table, and FIG. 37(d) illustrates exemplary contents of the input VC v. flow table, in said another condition according to specific example 3 of embodiment 3.

FIG. 39(a) and FIG. 39(b) illustrate exemplary contents of a direct-link management table according to embodiment 4.

FIG. 40(a) and FIG. 40(b) illustrate exemplary contents of the ATM routing table according to embodiment 4.

FIG. 42(a) and FIG. 42(b) illustrate exemplary contents of an IP routing table according to embodiment 5.

FIG. 43(a) and FIG. 43(b) illustrate exemplary contents of the ATM routing table of embodiment 5.

DETAILED DESCRIPTION OF THE PREFERRED EMBODIMENTS

Figure 2:
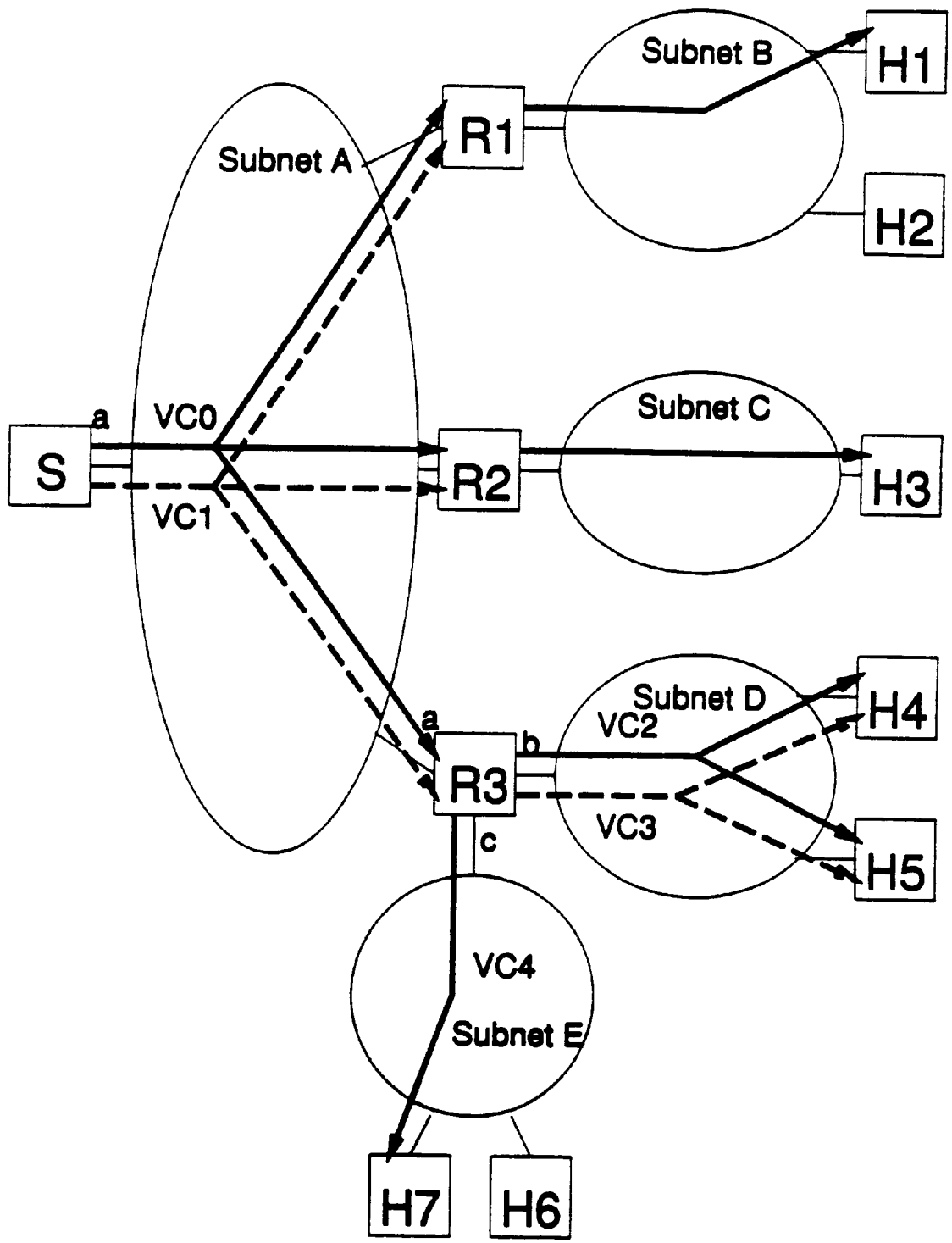
FIG. 2 is an exemplary network topology and virtual connections according to specific example 1 of embodiment 1.

The following are terms and explanations relating to the present invention.

A "host" means an apparatus that sends and receives packets. A "router" means an apparatus that not only sends and receives packets but also transfers packets from one logical network to another logical network. A "node" indicates either a host or a router, which can process packets at the network layer.

A "node connected to a virtual-connection-oriented network" means a node having an interface that can transmit or receive packets having virtual connection identifiers attached. For example, a virtual connection can be set up, such as Asynchronous Transfer Mode (ATM), not only in a case where there is one or more switch within the logical network, but also a case of a point-point physical link in which the logical network does not include a switch.

A "point-multipoint VC" indicates a virtual connection wherein, when one packet is sent from a source node, a plurality of packets arrive at a plurality of receiving parties. If the receiving parties comprise only a single node, the VC is similar to a point-point VC, but the VC is still called a point-multipoint VC.

A "destination address" indicates a destination network-layer address and includes not only a unicast address but also a group address of multicast.

A "flow" indicates a group of packets specified by some information. For example, a flow may be a group of packets having at least a specified destination address. The destination address may be a destination address prefix that can signify a destination network. As the information for specifying the flow, a destination port number of the transport layer can be used in addition to the destination address. Also, a source address can be used. The "transport-layer destination port number" signifies a certain specific application at the destination node, so the flow may be specified alternatively by an identifier having the same meaning as this. In Internet Protocol Version 6 (IPv6), a packet group containing a specific Flow ID, instead of a specific destination address, can also be the specified flow.

A "virtual connection to be used to transmit packets for which different QOS is requested" can be a VC with a different bandwidth, or a VC for which different resource reservation is effected by either node of the ends of the VC. Also, a VC directly linked through a switching function at a layer lower than the network layer at either router of the ends of the VC can be a VC for which different QOS than a VC for ordinary hop-by-hop transfer is requested. The case where "different QOS is requested" includes a case where some QOS is requested for one flow and no QOS is requested for another flow. VCs with different resources may be a VC with some resources and a VC with no resource.

A "virtual connection from a given node to a plurality of other nodes" can be a point-multipoint VC from a given node to a plurality of other nodes, or a group of point-point VCs from a given node to a plurality of other respective nodes. Alternatively, it may be a combination of a point-multipoint VC to some nodes and point-point VCs to other nodes. Or it may be a point-point VC from a given node to a multicast server and the aforesaid VC(s) from the multicast server to a plurality of nodes.

(Embodiment 1)

This embodiment provides a scheme (specific examples 1 through 3) of implementing multicast packet transfer with different QOS requests, in which reception of multicast packets by each node can be achieved without duplication. An advantage of this embodiment is that network resources can be efficiently utilized, since no duplicated packets flow into the network.

(Embodiment 1, Specific example 1)

FIG. 1 shows a network topology described in this embodiment. The nodes constituting the networks comprise a host (S) sending multicast packets, routers (R1, R2, R3) that transfer the packets, and receiving hosts (H1, H2 . . . H7). Sending host S has a single interface (I/F), called "a." R3 has three I/Fs, namely, "a," "b," and "c."

In this layout, hosts are connected upstream and downstream of a router. For example, sending host (S) communicates through router (R1) with receiving host (H1). Similar operation is performed when routers are connected upstream and downstream of router (R1). For example, sending host (S) can communicate through a router, router (R1), and another router with receiving host (H1).

Each of the nodes belongs to one or more subnet (logical network). A "subnet" is an area in which communication can be effected directly without going through a router. For communication from/to outside of the subnet, packet transfer using a router is required.

The nodes that belong to the same subnet in the layout of FIG. 1 are as follows: (S, R1, R2, R3) belongs to subnet A; (R1, H1, H2) belongs to subnet B; (R2, H3) belongs to subnet C; (R3, H4, H5) belongs to subnet D; and (R3, H6, H7) belongs to subnet E. The nodes are mutually connected through a virtual-connection-oriented network within the subnet.

A method of transfer of multicast packets of destination address G and source address S for the case of the above layout will now be described. The nodes belonging to the group of destination address G are taken to be H1, H3, H4, H5 and H7.

Virtual connections as shown in FIG. 1 are set up in a case where the QOS is just "best effort" (no QOS). When sending multicast packets of destination address G from sending host S, distribution is effected through VC0 to R1, R2 and R3. When R1 receives these packets, it distributes the packets to H1; R2 distributes the packets to H3; R3 distributes the packets to H4 and H5 by VC2 and distributes the packets to H7 by VC4.

In FIG. 1, the multicast packets are transferred using point-multipoint VCs; however, a multicast server can be employed alternatively. In the following examples, where a multipoint-point VC is employed, it is also possible to employ a multicast server. A multicast server transfers packets received from a point-point VC onto a point-multipoint VC.

An example where, from a condition as shown in FIG. 1, H5 has requested QOS for packets of destination address G and destination port number 1 is now described. The QOS request can be transmitted using a resource reservation protocol, such as RSVP. Another QOS request protocol capable of notifying a neighboring node of the requested QOS may be used.

As shown in FIG. 2, when QOS has been requested from H5 under RSVP, R3 sets up a point-multipoint VC (VC3) from output I/F (b), in order to transfer packets of destination address G and destination port number 1 to nodes (H4, H5) participating in group G in the same subnet (subnet D). In the drawings, the VC indicated by the dotted line and the VC indicated by the continuous line are respectively associated with different QOS requests in regard to the packets to be transferred thereby. VC3 is employed to transfer packets of destination address G and destination port number 1. VC2, which had hitherto transferred all packets of destination address G, starts to transfer packets of destination address G excluding the packets of destination address G and destination port number 1 which are flowing onto VC3.

R3 transfers the QOS request to S, and S sets up VC1, in a similar way as VC3. S transmits the packets that are to be transferred by VC3 onto VC1, while transmitting the packets that are to be transferred by VC2 onto VC0. If the QOS request is transferred by using RSVP, the request is transferred in this way from a downstream node to an upstream node. If another scheme is employed as the QOS request protocol, it may be transferred in a different manner. However, whichever method of QOS request transfer is adopted, VC set-up is finally performed as shown in FIG. 2.

Essentially, a new point-multipoint VC, each leaf of which heads for each one of all the receiving parties belonging to the multicast group in the same subnet, is set up for the flow for which the QOS was requested. Set-up is effected such that packets of the flow for which QOS was requested are transferred through the newly established VC while the identical packets are not transferred through the old existing best-effort VC.

Since no QOS was requested regarding output I/F (c) of R3, all the packets of destination address G are transferred by the best-effort VC (VC4).

Next, a method of transfer of multicast packets onto VC0 and VC1 at sending node (S), and onto VC2, VC3 and VC4 at router (R3) will be described in detail.

Figure 3:
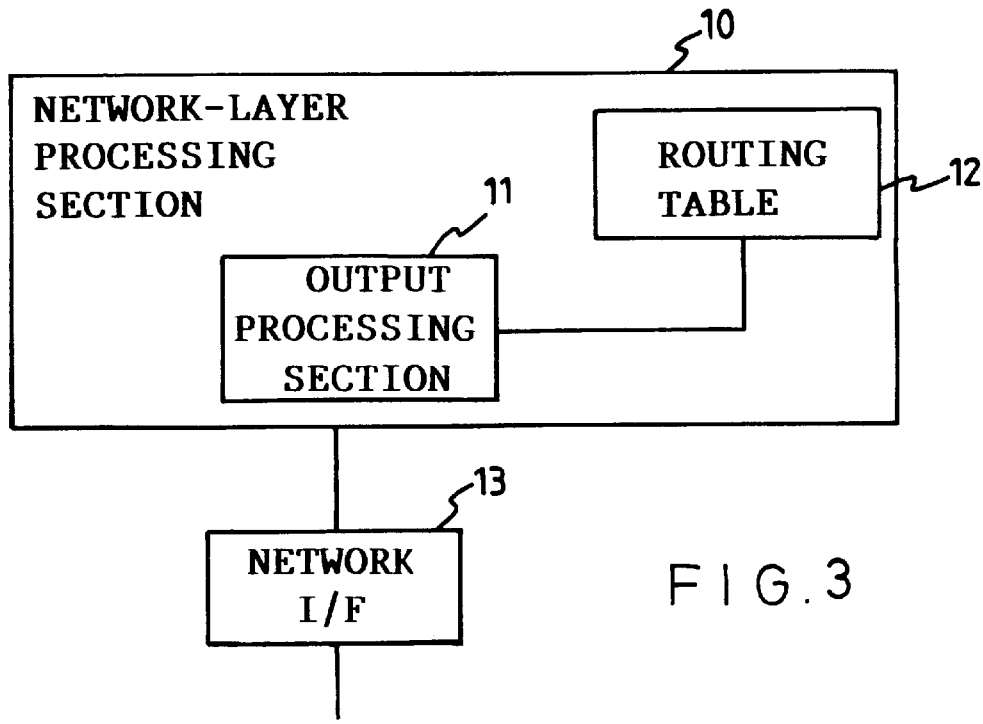
FIG. 3 is a functional block diagram showing an exemplary configuration of a sending node.

Sending node S has a configuration as shown in FIG. 3. Packets are sent through network I/F (13) in accordance with the flowchart shown in FIG. 5 by output processing section (11). Network-layer processing section (10) includes output processing section (11) and routing table (12). Output processing section (11) refers to routing table (12). In the following description, FIG. 6 is used as an example of routing table (12). This routing table is set up when multicast routing protocol is exchanged or QOS is requested.

The procedure whereby multicast packets of source S, destination G, destination port 1 (hereinafter expressed as (S, G, 1)) are transferred will be described. An output VC pointer is obtained (S1) by searching routing table (a) (FIG. 6(a)), using the set: (source, destination, destination port) of the packet as a key.

In this search process, the source and destination addresses of the selected entry in the routing table (a) are required to coincide with the source and destination address of the packet. Regarding the destination port, if an identical destination port is present in the routing table (a), the entry including the identical destination port is selected. If an identical destination port is not present but there is an entry whose destination port is not specified, the entry having the wild-card destination port is selected. Hereinafter, this search method is referred to as a "best-match" searching method. In FIG. 6, the case where the destination port is not specified (i.e., is wild-card) is indicated by "–". In FIG. 6, the entry (S, G, I) indicates the output VC pointer "2," so "2" is returned as the result of the search process.

Next, routing table (b) (FIG. 6(b)) is searched, using the output VC pointer from table (a) as a key, to obtain an output I/F and output VC, and then a packet is transmitted onto the obtained output VC of the obtained output I/F (S2). Since the output pointer is "2," output I/F=a, output VC=VC1 in the entry of address "2" in FIG. 6 are obtained, the packet is sent with output I/F=a and output VC=VC1. When the next pointer is sought, and no corresponding entry exists ("X") (S3 NO), processing stops.

Now consider a case where the packet that is sent has source S, destination G and destination port 2. Routing table (a) is searched in accordance with the flowchart of FIG. 5. None of the entries in the routing table of FIG. 6 corresponds exactly to (S, G, 2). However, in the set (S, G), there is an entry (S, G, –) for which the destination port is not specified, so output VC pointer "1" is obtained.

Then, the packet is sent to output I/F=a, output VC=VC0 written in the entry of address "1" in routing table (b). No further pointer exists, so sending of the packet terminates.

Next, a method of packet transfer at router 3 (R3) will be described in detail.

Figure 4:
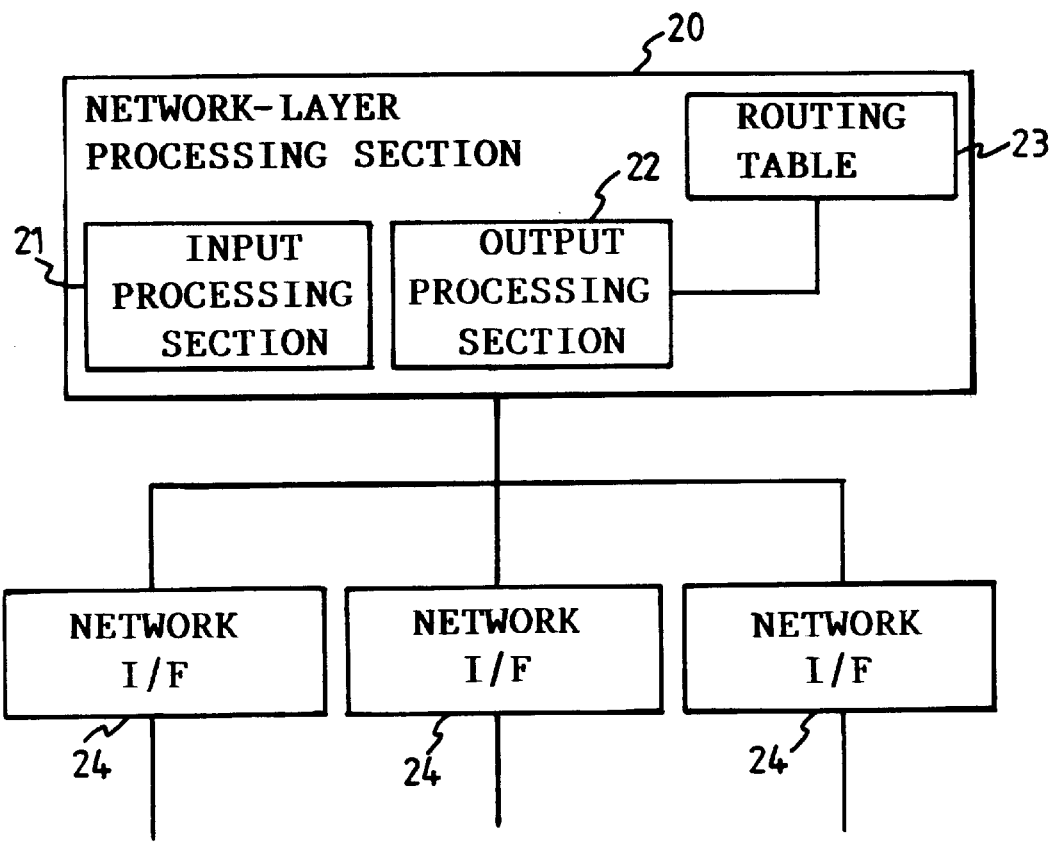
FIG. 4 is a functional block diagram showing an exemplary configuration of a router according to embodiment 1.

FIG. 4 shows an exemplary configuration of a router in accordance with the principles of the present invention. Packets input from network I/F (24) are subjected to input processing by input processing section (21), and then output processing section (22) is consulting routing table (23), to send the packets to the network through network I/F (24). Sending is effected in accordance with the flowchart shown in FIG. 5, which shows operation of output processing section (22). This operation is similar to that of sending node (S). Network-layer processing section (20) includes input processing section (21), output processing section (22) and routing table (23). The routing table in R3 is as shown in FIG. 7.

When a multicast packet (source S, destination G, destination port 1) is received from source S, R3 searches routing table (a) (FIG. 7(a)), using (S, G, 1) as a key in order to transfer the packet (S1). There is in fact an entry (S, G, 1) that fully agrees with the packet, so "3," which is the output VC pointer of this entry, is obtained. This packet is then transferred (S2) to output I/F=b, output VC=VC3 written in the address "3" of routing table (b) (FIG. 7(b)).

Figure 5:
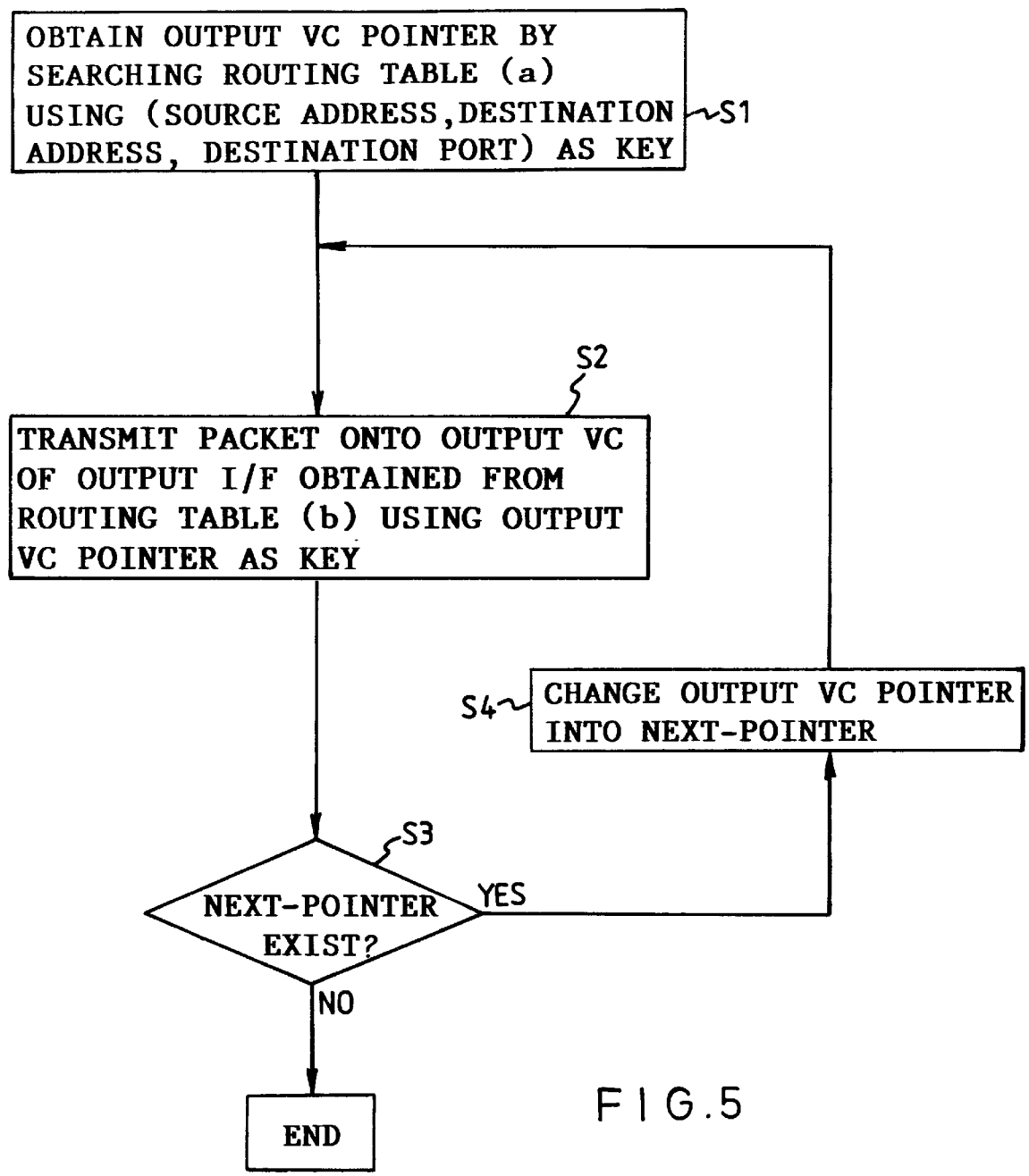
FIG. 5 is a flow chart showing an exemplary output processing procedure of packets in the network-layer processing section.

Continuing with FIG. 5, the next pointer is "4" (S3 YES), so, taking this pointer as the output VC pointer (S4), the packet is transferred also to output I/F=c, output VC=VC4, which is in the entry of address "4" of routing table (b) (FIG. 7(b)). There is no further pointer, so sending is stopped at this point.

When a multicast packet (source S, destination G, destination port 2) is received from source S, R3 searches routing table (a) (FIG. 7(a)), using (S, G, 2) as a key, in order to transfer the packet. The result of the search process is that this matches an entry (S, G, –), so output VC pointer "1" is obtained. The packet is sent to output I/F=b, output VC=VC2 pointed by address "1" in routing table (b) (FIG. 7(b)). As the next pointer is "2", the packet is sent also to output I/F=c, output VC=VC4, which is in the entry of address "2" of routing table (b) (FIG. 7(b)). Since there is no further pointer, processing stops at this point.

The above description was given for the case of R3 only, but similar operations take place in R1 and R2. However, since no QOS is requested downstream of R1 and R2, all the packets of destination address G (packets arriving by VC0 and packets arriving by VC1) are transferred by one "best effort" VC.

The characteristic features of this example may be summarized as follows. In order to transfer packets to a plurality of destination nodes (H1, H3, H4, H5, H7) in multicast communication, a plurality of virtual connections (VC0 and VC1, or, VC2 and VC3) to a plurality of second nodes (R1 and R2 and R3, or, H4 and H5) are set up from a first node (S or R3). Then, the first node transmits packets (S, G, 1) belonging to a specified flow onto some (VC1 or VC3) of the plurality of virtual connections; and transmits packets destined for the destination nodes other than those belonging to the specified flow onto other (VC0 or VC2) of the plurality of virtual connections, so that all packets to the destination nodes can be received without duplication by the respective second nodes from the plurality of virtual connections.

The virtual connection (VC1 or VC3), whereby packets belonging to a flow for which a specified QOS is to be provided are transferred, is set up when the specified QOS is requested for this flow (S, G, 1) by at least one of the plurality of destination nodes (for example, H5).

The virtual connection (VC1 or VC3) can be set up when a packet of a specified protocol (either a packet to a second node or a packet from the second node) is detected and the protocol is instructing use of a virtual connection separate from the currently used virtual connection (VC0 or VC2) in order to transfer packets to one of the plurality of destination nodes (for example, H5). In this case also, it can be said that this separate virtual connection (VC1 or VC3) serves to transfer packets with a specified QOS and that this destination node (H5) has requested the specified QOS for that packet flow.

If no destination node has requested any specified QOS for the aforesaid flow in a logical network (subnet E) downstream of the second node (R3), the second node (R3) sends both (S, G, –) packets belonging to the aforesaid flow and other packets destined to the destination nodes received from the first node onto one virtual connection (VC4) to a next-hop node.

Consequently, all the packets can be reliably transferred to each destination node without duplication while satisfying the QOS for the specified flow requested by one or more of the destination nodes.

(Embodiment 1, Specific example 2)

In this specific example, multicast packets are transferred by setting up a new VC toward a node that has requested QOS to transfer the flow for which QOS has been requested, while setting up another new VC toward a node that has not requested QOS to transfer the aforesaid flow.

Figure 8:
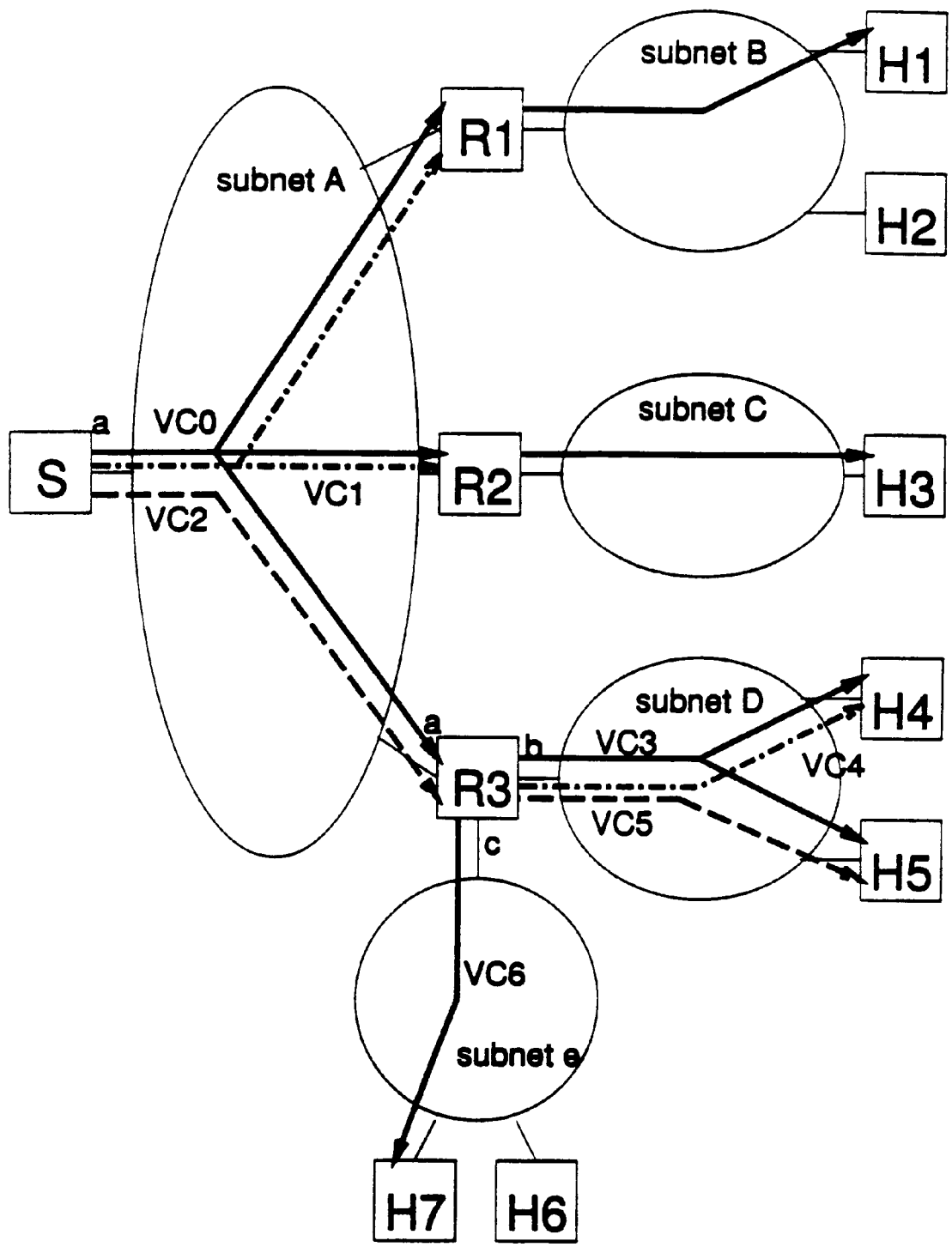
FIG. 8 is an exemplary network topology and virtual connections according to specific example 2 of embodiment 1.

FIG. 8 is a diagram of the set-up of VCs after H5 has requested QOS for packets (S, G, 1) and this request has arrived at S through R3. VC2 and VC5 are VCs for transferring packets (S, G, 1) with the requested QOS. VC1 and VC4 are VCs for transferring packets (S, G, 1) to nodes other than those which have requested QOS. VC0 and VC3 are VCs for transferring packets of destination address G except the packets (S, G, 1). VC6 is a VC for transferring packets of destination address G.

By setting up a configuration as above, packets can be distributed to all nodes participating in a group without duplication of identical packets.

The method of packet transfer shown in FIG. 5 referred to in specific example 1 is also used in this example. The routing table of S is shown in FIG. 9 and the routing table of R3 is shown in FIG. 10. S and R3 operate as in the case of specific example 1 regarding packet forwarding, but the results are different in accordance with the contents of routing tables.

The characteristic features of this example may be summarized as follows. In order to perform packet transfer to a plurality of destination nodes (H1, H3, H4, H5, H7) in multicast communication, a plurality of virtual connections (VC0 and VC1 and VC2, or, VC3 and VC4 and VC5) are set up to at least one of a plurality of second nodes (R1, R2, R3 or H4, H5) from a first node (S or R3). The QOS requested for the packets to be transferred through VC2 and VC5 is different from that of VC0 and VC3, or VC1 and VC4.

Then, the first node transmits packets (S, G, 1) belonging to a specified flow onto some (VC1 and VC2, or, VC4 and VC5) of the plurality of virtual connections; and transmits packets destined for the destination nodes other than those belonging to the specified flow onto other (VC0 or VC3) of the plurality of virtual connections, so that the entire packets to the destination nodes can be received without duplication by the respective second nodes from at least two of the plurality of virtual connections.

Other characteristic features in this example are similar to specific example 1.

(Embodiment 1, Specific example 3)

In this specific example, two new VCs are set up toward a node that has requested QOS, while a leaf to that node is removed from an existing "best-effort" VC. One of the newly set up VCs transfers a flow for which QOS has been requested, while the other transfers packets other than the aforesaid flow.

Figure 11:
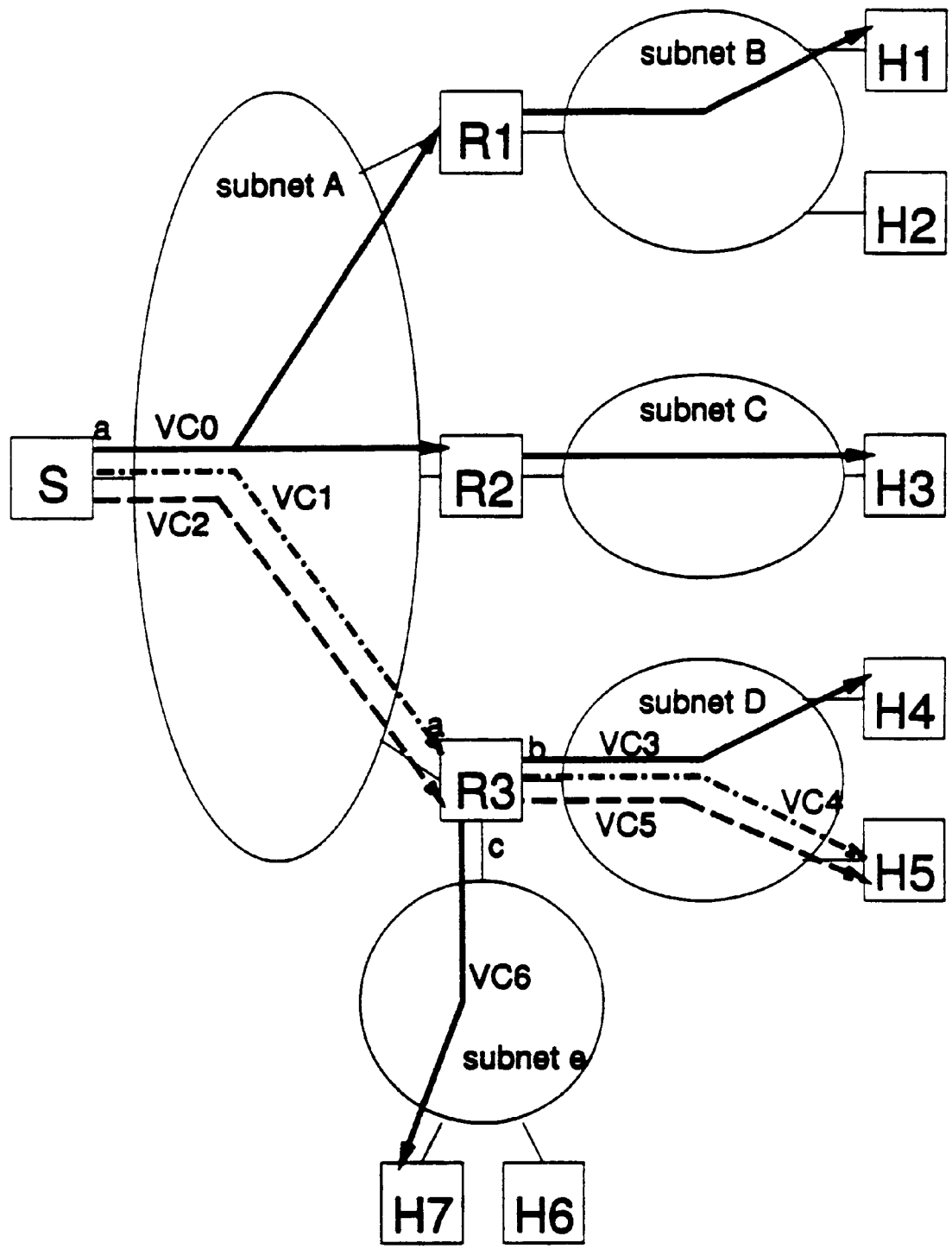
FIG. 11 is an exemplary network topology and virtual connections according to specific example 3 of embodiment 1.

FIG. 11 is a diagram showing the set-up of VCs after H5 has requested QOS of packets (S, G, 1) and this request has arrived at S through R3. VC1 and VC4 are new VCs for transferring packets for which QOS has not been requested, while VC2 and VC5 are other new VCs for transferring packets for which QOS has been requested. The leaf to R3 is deleted from "best-effort" VC0, and the leaf to H5 is deleted from "best-effort" VC3.

The method of packet transfer shown in FIG. 5 referred to in specific example 1 is also used in this example. The routing table of S is shown in FIG. 12 and the routing table of R3 is shown in FIG. 13. S and R3 operate as in the case of specific example 1 regarding packet forwarding, but the results are different in accordance with the contents of routing tables.

The characteristic features of this example may be summarized as follows. In order to transfer packets to a plurality of destination nodes (H1, H3, H4, 145, H7) in multicast communication, there are set up from a first node (S or R3), a plurality of first virtual connections (VC1 and VC2, or, VC4 and VC5) to a specified one (R3 or H5) of a plurality of second nodes (R1 and R2 and R3, or, H4 and H5), and a second virtual connection (VC0 or VC3) to second nodes other than the specified node. The QOS request for packets transferred through VC2 and VC5 is different from that of packets transferred through VC0 and VC3, or VC1 and VC4.

Then, the first node transmits packets (S, G, 1) belonging to a specified flow onto some (VC2 or VC5) of the plurality of first virtual connections and the second virtual connection (VC0 or VC3); and transmits packets destined for the destination nodes other than those belonging to the specified flow onto other (VC1 or VC4) of the plurality of first virtual connections and the second virtual connection (VC0 or VC3), so that all packets to the destination nodes can be received without duplication by the respective second nodes from at least one of the plurality of virtual connections. Packets (S, G, –) flow onto VC0 and VC3. Destination node (H5) that has requested specific QOS for (S, G, 1), or a node (R3) which packets destined for this destination have to pass through, is the specified node referred to above.

Other characteristic features in this example are similar to specific example 1.

(Embodiment 2)

The embodiment shown in FIGS. 14 through 20 provides a scheme of implementing multicast packet transfer with different QOS in which, although duplicated packets are received at each node, packets are selectively deleted to avoid processing both of the duplicated packets.

Initially, VCs are set up as in FIG. 1 in the same way as in embodiment 1 when only "best-effort" service is provided.

Figure 14:
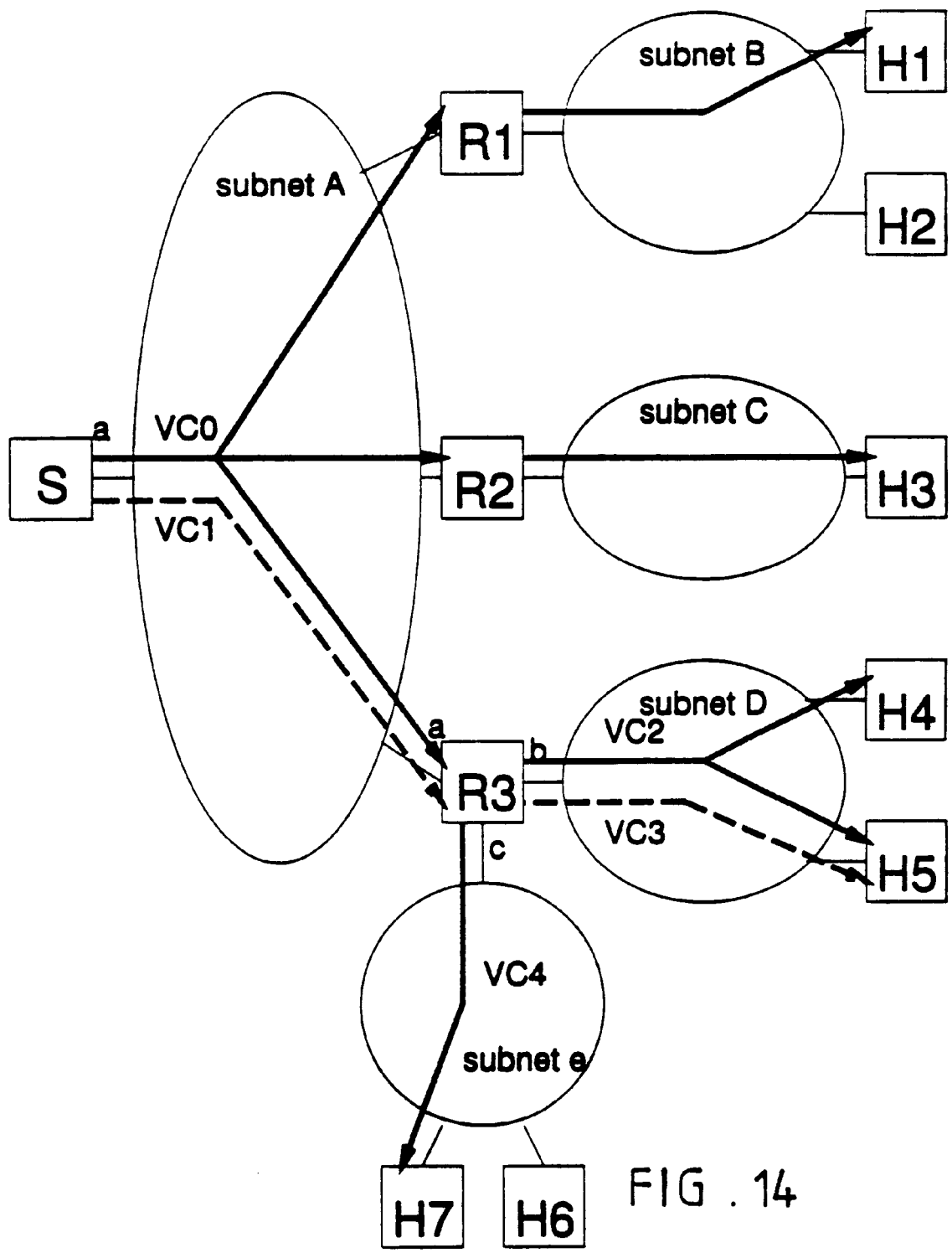
FIG. 14 is an exemplary network topology and virtual connections according to embodiment 2.

Now consider a case where a receiving host H5 requests QOS for multicast packets of source S, destination address G, and destination port 1 (hereinafter referred to as (S, G, 1)) and H5 transmits the QOS request using RSVP. R3 sets up VC3, which is a point-multipoint VC satisfying the QOS, as shown in FIG. 14, and then sends packets (S, G, 1) by this VC. R3 also notifies H5 that packets (S, G, 1) are being sent through VC3. Since R3 is still sending packets of destination address G through VC2, H5 is receiving packets (S, G, 1) from both VC2 and VC3. However, duplicated processing of packets is avoided by discarding the packets (S, G, 1) arriving from VC2.

R3 makes a QOS request to source S, and then VC1 is set up in a similar way as VC3.

R3 prevents duplicated transfer of packets by discarding packets (S, G, 1) arriving from VC0, by being notified that packets (S, G, 1) are flowing onto VC3 from S.

The operations of S, R3 and H5 when sending packets (S, G, 1) and when sending packets (S, G, 2) will now be described in detail.

Figure 15:
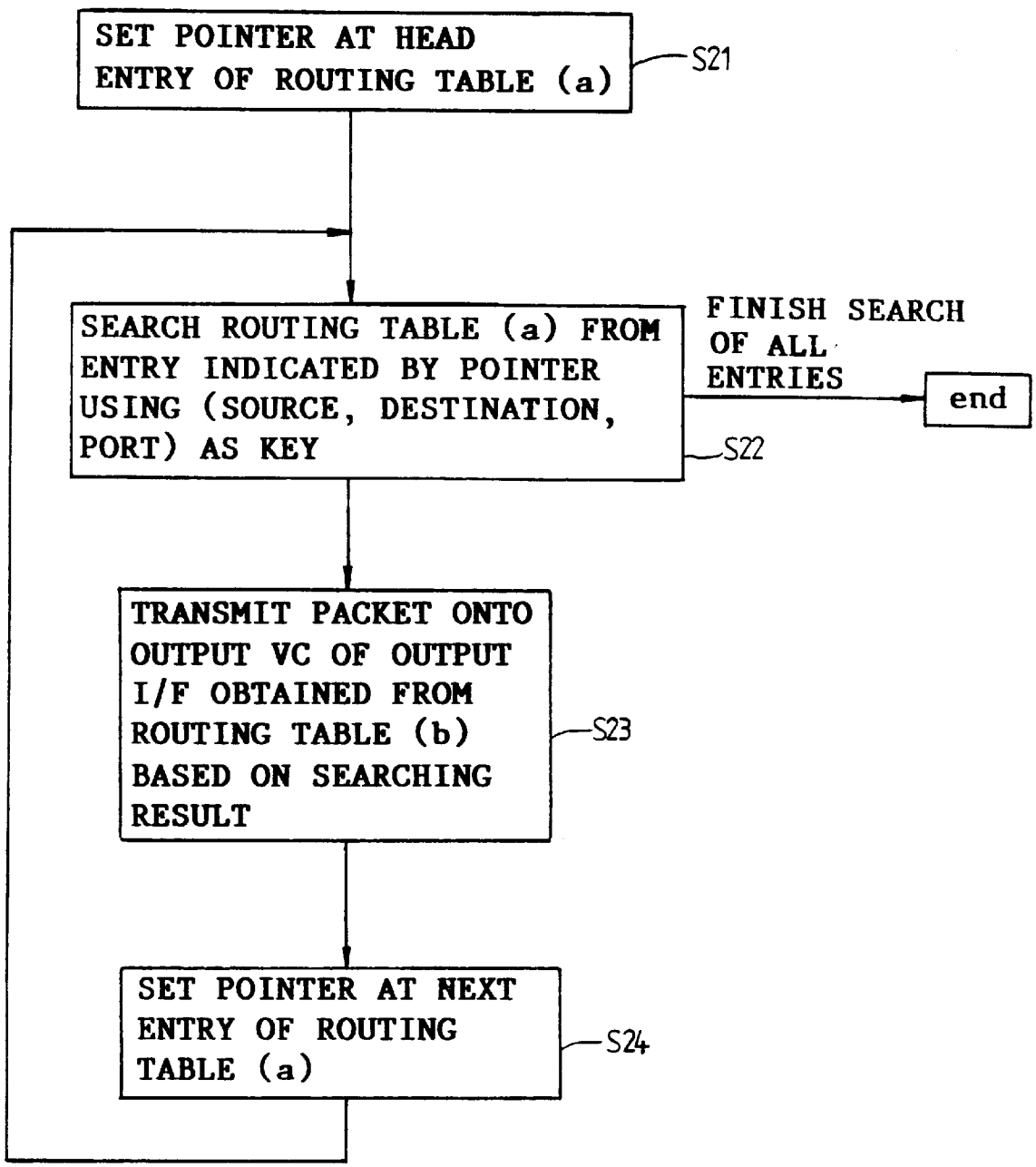
FIG. 15 is a flow chart showing another exemplary output processing procedure of packets in the network-layer processing section.

The configuration of sending host S is shown in FIG. 3, and the output procedure of output processing unit (11) is in accordance with the flowchart of FIG. 15. The routing table of S is shown in FIG. 16.

Figure 17:
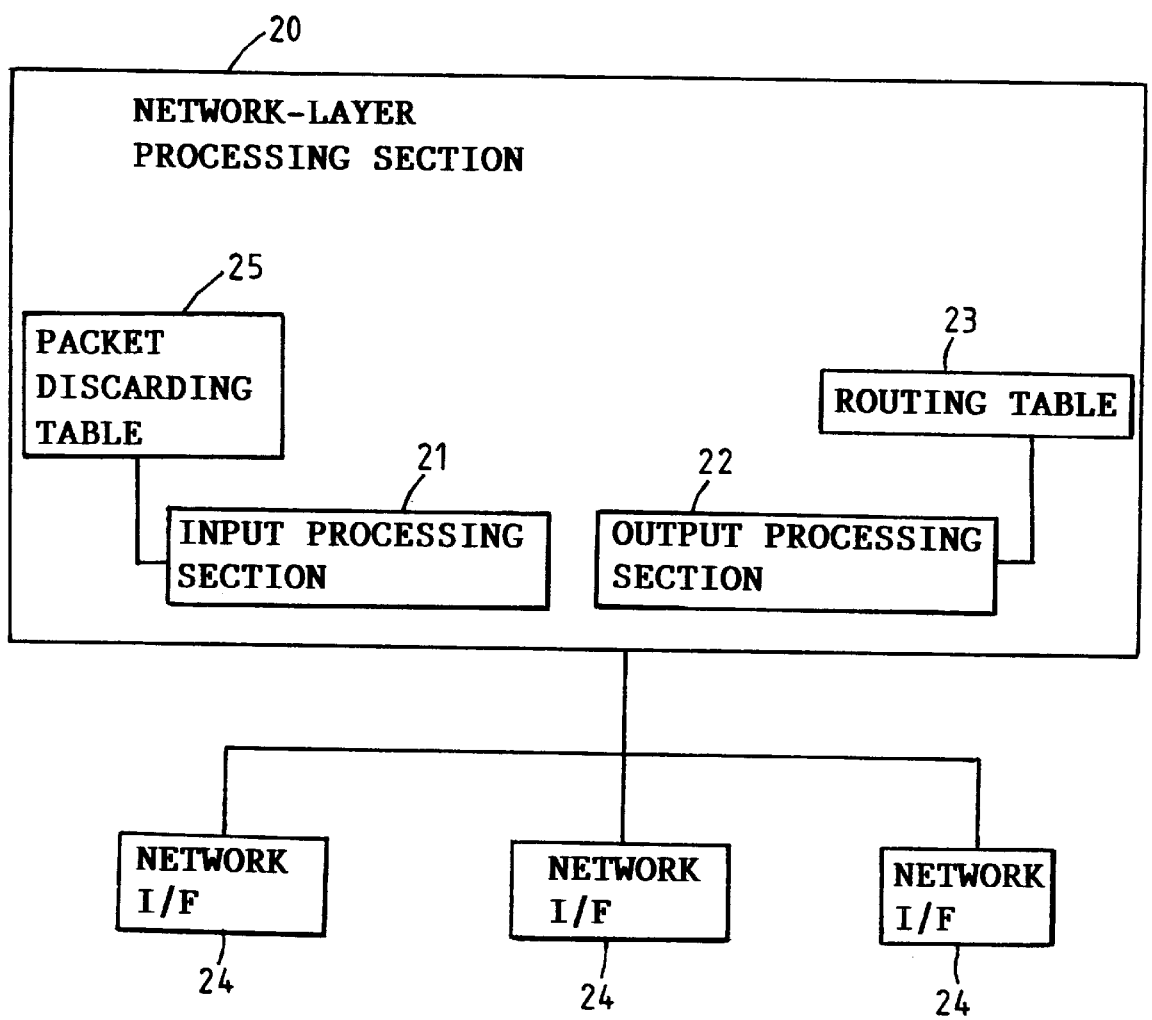
FIG. 17 is a functional block diagram showing an exemplary configuration of a router according to embodiment 2.

The configuration of router R3 is shown in FIG. 17. The difference between the router of FIG. 17 and the router of embodiment 1 (FIG. 4) is that packet discarding table (25) used by input processing section (21) is added. The sending sequence in output processing section (22) is in accordance with the flowchart of FIG. 15. The routing table of R3 is shown in FIG. 18, and the packet discarding table of R3 is shown in FIG. 19.

The configuration of receiving host H5 is shown in FIG. 20. Packets input from network I/F (34) are discarded if they are duplicated. This is achieved by input processing section (31), referring to packet discarding table (35). The discarding packet table of H5 is also shown in FIG. 19.

When S sends a packet (S, G, 1), it first of all sets a pointer at the head of routing table (a) of FIG. 16 (S21 in FIG. 15). Next, it searches routing table (a) (FIG. 16(a)) using (S, G, 1) as a key starting from the entry indicated by this pointer (S22) and stepping through the table until one entry is selected or there are no more entries to search. In other words, entries whose source and destination addresses match with those of the packet are extracted, and then, among the extracted entries, one or more entries are selected as far as its destination port matches with that of the packet. Namely, a method of non-"best match" searching is employed in this embodiment.

Comparing at the first row of routing table (a) (FIG. 16(a)), it is found that the entry (S, G, –) matches with (S, G, 1), so output VC pointer "1" is obtained. The packet is sent onto the output VC indicated by the output pointer (S23), in this example, onto output I/F=a, output VC=VC0 indicated by address "1" in routing table (b) (FIG. 16(b)). Routing table (b) (FIG. 16(b)) yields no further pointer, so the processing of S23 is terminated.

Then, the pointer shifts to the next entry, in this example, to the second row, of routing table (a) (FIG. 16(a)) (S24), and routing table (a) (FIG. 16(a)) is further searched based on (S, G, 1) (S22). On searching from the second row, it is found that the entry (S, G, 1) matches with (S, G, 1), so output pointer "2" is obtained. The packet is transmitted onto output I/F=a, output VC=VC1 of address "2" of routing table (b) (FIG. 16(b)) (S23). Since there is no further pointer in routing table (b) (FIG. 16(b)), the pointer shifts to the third row of routing table (a) (FIG. 16(a)) (S24), whereupon it is found that searching of all the entries has been completed in S22, so transmission of the packet terminates.

R3 receives double packets (S, G, 1) from VC0 and VC1. The received packets, together with the virtual connection identifier received from the network I/F (24), are handed over to network-layer processing section (20). Input processing section (21), when the packets are handed over, checks by searching packet discarding table (25) of FIG. 19 to find out whether they are packets that should be discarded.

The set (source address, destination address, destination port) of the received packet is checked against the packet discarding table. If there is a matching entry, only a packet coming from the input I/F, input VC given in this table is allowed through. A packet having (source address, destination address, destination port) and coming from another VC than the written VC is discarded.

Packets (S, G, 1) received from VC0 and VC1 match the entry in the packet discarding table of FIG. 19. Therefore, only packets received from input I/F=a, input VC=VC1, as indicated in the table, are allowed through. The packets (S, G, 1) coming from VC0 are discarded. The packets coming from VC1 are subjected to the following packet transfer processing.

This entry in the packet discarding table is created when R3 is notified that packets (S, G, 1) are being transmitted through VC1 from S.

R3 transfers a packet in accordance with the flowchart of FIG. 15 in a similar way as S, using the routing table shown in FIG. 18. The pointer shifts to the head of routing table (a) (FIG. 18(a)) (S21), and R3 checks to examine whether the first row of routing table (a) (FIG. 18(a)) matches (S, G, 1). Since the first row is (S, G, –) (i.e., matches (S, G, 1)), output VC pointer "1" is obtained (S22). So, the packet (S, G, 1) is sent onto output I/F=b, output VC=VC2 of address "1" of routing table (b) (FIG. 18(b)).

Since the next pointer indicates "2," the packet (S, G, 1) is sent also onto output I/F=c, output VC=VC4 of address "2" of routing table (b) (FIG. 18(b)) (S23).

Since there is no further pointer in routing table (b) (FIG. 18(b)), the pointer of routing table (a) (FIG. 18(a)) shifts to the second row (S24). R3 checks to see whether the entry there matches (S, G, 1). Since there is an entry (S, G, 1), output VC pointer "3" is obtained (S22). The packet (S, G, 1) is sent onto output I/F=b, output VC=VC3 of address "3" of routing table (b) (FIG. 18(b)) (S23). Since there is no subsequent pointer in routing table (b) (FIG. 18(b)), the pointer of routing table (a) (FIG. 18(a)) shifts to the third row (S24), and then it is found that all of routing table (a) (FIG. 18(a)) has been searched, so transfer of the packet terminates.

H5 receives duplicated packets (S, G, 1) from VC2 and VC3. Just as in the case of R3, by referring to the packet discarding table, it is decided whether the received packet is to be discarded or not. The packets (S, G, 1) coming from VC2 are discarded, while the packets (S, G, 1) coming from VC3 are not discarded and are subjected to processing at the network or higher layer. In this way, H5 can avoid processing both of the duplicated packets.

Now, the procedure for transfer of packets (S, G, 2) is described below. S searches routing table (a) of FIG. 16, using (S, G, 2) as a key. Since the entry (S, G, –) is matched, output VC pointer "1" is obtained. The packets are transmitted onto output I/F=a, output VC=VC0 of address "1" of routing table (b) of FIG. 16. Since there is no subsequent pointer in routing table (b), next searching is performed from the next entry of routing table (a), using (S, G, 2) as a key. There is no corresponding entry, so transmission of the packet is thereupon terminated.

R3 finds that the received packets (S, G, 2) are not to be discarded, referring to the packet discarding table, and then the packets are transferred through output I/F=b, output VC=VC2 and output I/F=c, output VC=VC4, in accordance with the operation described above.

Alternatively, output processing of packets in this embodiment can be performed by the method of specific example 2 of embodiment 3 that will be described later. Specifically, the flowchart of FIG. 5 ("best-match" searching method) is employed as the packet sending procedure, while the next pointer of address "1" of routing table (b) of FIG. 16 is set to "3" and an entry of [output I/F=a, output VC=VC1, next pointer="X"] is added at address "3".

An advantage of this embodiment is that the set-up procedure involved in changing a condition from FIG. 1 (where the QOS is only "best-effort") to FIG. 14 (where new VCs are set up corresponding to a QOS request) can be simpler than that of embodiment 1. Also, the number of VCs to be set up can be small, since only VCs along the path from the source to the destination that requested QOS are to be newly set up.

The characteristic features of this embodiment may be summarized as follows. In order to transfer packets to a plurality of destination nodes (H1, H3, H4, H5, H7) in multicast communication, there are set up from a first node (S or R3), a first virtual connection (VC0 or VC2) to a plurality of second nodes (R1 and R2 and R3, or, H4 and H5), and a second virtual connection (VC1 or VC3) to at least a specified one (R3 or H5) of the plurality of second nodes. The first and second virtual connections are different in the QOS requests.

Then, the first node transmits packets such that the respective second nodes receive packets (S, G, –) destined for the destination nodes by the first virtual connection, and that at least the specified node receives packets (S, G, 1) belonging to a specified flow not only by the first virtual connection but also by the second virtual connection.

The specified node (R3 or H5) selects packets (S, G, 1) belonging to the specified flow from the packets (S, G, –) received by the first virtual connection (VC0 or VC2), and discards the selected packets.

The second virtual connection (VC1 or VC3) is set up when a specified QOS is requested for the aforesaid flow by at least one (for example, H5) of the plurality of destination nodes. The specified node can be either the destination node (H5) that requested this QOS, or a node (R3) through which the packets to the specified destination node pass.

The specified node (R3 or H5), on receiving duplicated packets belonging to the aforesaid flow, identifies a flow to which the packets that are to be received by the second virtual connection belong by using the packet discarding table, and selects packets belonging to the identified flow from the packets received by the first virtual connection to discard them. Packets which are not discarded ((S, G, 1) received by VC1 or VC3, and (S, G, –) excluding (S, G, 1) received by VC0 or VC2) are subjected to the network-layer processing for transfer to the next-hop node (i.e., analysis of a destination address contained in the packet) or for an application at a layer higher than the network layer.

If the specified node (R3) is not yet a destination node, and if the packets that have been processed at the network layer and are destined for the destination node do not belong to the specified flow, they are transferred onto VC2; if the above packets belong to the specified flow, they are transferred onto VC2 and VC3. That is, packets (S, G, 1) received by VC1 and packets (S, G, –) except (S, G, 1) received by VC0 are transferred through VC2, and packets (S, G, 1) received by VC1 are transferred through VC3. VC1 is dedicated to the specified flow and VC3 is likewise dedicated to the specified flow.

It is possible to set up VC1 or VC3 also to a second node other than the specified node. In this case, the other second node (R1, R2 or H4) for which the second virtual connection operates in a similar way as the specified node referred to above. If there is no virtual connection dedicated to the specified flow downstream of the other second node, the other second node can transfer all the packets that were not discarded onto one "best-effort" virtual connection present on the downstream side.

Alternatively, the router in embodiment 2 may be constructed as follows. In order to determine an output VC for packets to be transferred through the VC dedicated to the specified flow, the router refers to a datalink-layer (e.g., ATM) routing table, instead of performing the network-layer processing by referring to the routing table based on the destination address.

The ATM-level routing table in R3 stores information specifying that packets from VC1 are to be transferred onto only VC3, which is the VC dedicated to the specified flow to the next-hop node. The packets from VC1 are therefore transferred onto VC3 without being transferred onto VC2. It is possible to process the packets from VC1 at the network layer only regarding other processing than for determining the output VC based on the destination address.

The network-layer-level routing table in R3 stores information specifying that packets of destination address G are to be transferred onto only VC2. Consequently, packets from VC0 are transferred onto VC2 without being transferred to VC3.

In this way also, router R3 can prevent the double packets (S, G, 1) from being further duplicated by transfer onto both VC2 and VC3, even without discarding packets. However, in this case also, the destination node discards packets (S, G, 1) coming from VC2.

Consequently, according to this embodiment, the duplicated packets can be transferred to a next-hop node without further inadequate duplication, and an spurious operation of the application software in the receiving node can be prevented.

(Embodiment 3)

This embodiment provides a scheme (specific examples 1 through 3) of implementing multicast packet transfer with different QOS requests by using the CSR technology.

CSR is an exemplary router having a function for transferring packets at a layer lower than the network layer (e.g. in ATM cell units). CSR has an ATM switch function in addition to a function for transferring packets in IP packet units, in order to achieve high throughput and low latency packet transfer for internetwork environment.

Figure 21:
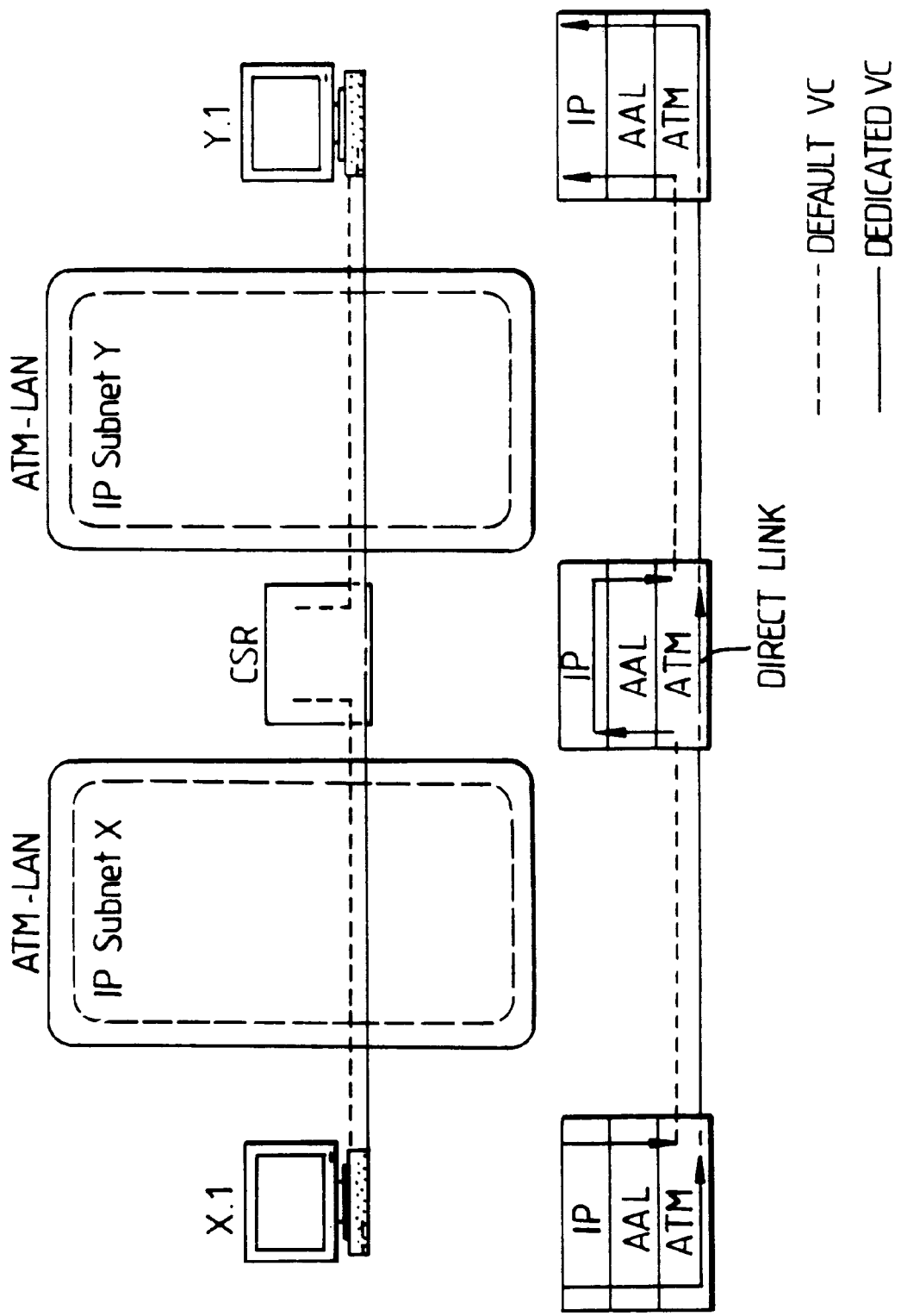
FIG. 21 is a diagram given in explanation of the operation of CSR.

A simple description of the operation of a CSR will now be given with reference to FIG. 21. It is considered a case where packets are transferred from X.1 through the CSR to Y.1.

In order to perform IP packet transfer (i.e., hop-by-hop transfer), packets are sent onto an ATM connection, which is set up for transfer of packets of various destinations from X.1 to the CSR. This ATM connection will be called a default VC. The CSR determines a next-hop node by examining the destination of the IP packet. This analysis of the destination address is performed by IP processing. In this case, the next-hop node is Y.1, so packets are transferred to Y.1 by sending the packets onto a default VC.

In order to perform ATM cell transfer, an ATM connection from X.1 to the CSR dedicated to transfer of packets to Y.1 and an ATM connection from the CSR to Y.1 dedicated to transfer of packets to Y.1 are set up. These ATM connections will be called dedicated VCs. The CSR sets up the ATM switch function in the CSR so as to transfer ATM cells from one dedicated VC to the other dedicated VC, bypassing the IP processing. That is, the CSR stores the correspondence relationship between a VPI/VCI at the receiving port of the dedicated VC from X.1 to the CSR and a VPI/VCI at the sending port of the dedicated VC from the CSR to Y.1 in a routing table at the ATM level. In this way, a bypass pipe (i.e., a cut-through connection) can be formed that directly links the dedicated VCs belonging to different logical networks (e.g. IP subnets).

When X.1 sends packets to Y.1, the packets are transferred from X.1 to the CSR through the dedicated VC for Y.1. Then the CSR transfers the packets through the dedicated VC for Y.1 from the CSR to Y.1, while the packets are still in the form of ATM cells, by referring to the ATM-level routing table.

In the above example, packet transfer by directly linking the dedicated VCs is transferring packets in ATM cell units. However, the packet transfer through the directly linked dedicated VCs may also be transferring packets in AAL (ATM Adaptation Layer) frame units. In this case also, the AAL frame transfer is performed by referring to a routing table at ATM level. In either case, packets are transferred without network-layer processing.

Also, packet transfer through the directly linked dedicated VCs can be transferring packets from a dedicated VC, to which other network-layer processing (e.g., in the case of IP, decrementation of TTL (Time to Live), calculation of check sum, etc.) than determination of output VC based on the network-layer destination address with reference to an IP-level routing table is applied, onto a dedicated VC to the next-hop node. In this case too, the packet transfer can be performed by determining the output VC with reference to an ATM-level routing table. In this case, packets are transferred with only some of the network-layer processing, without destination analysis at the network layer.

The embodiments according to the present invention, which will be described below, can be applied to any of the configurations using a CSR described above.

Figure 22:
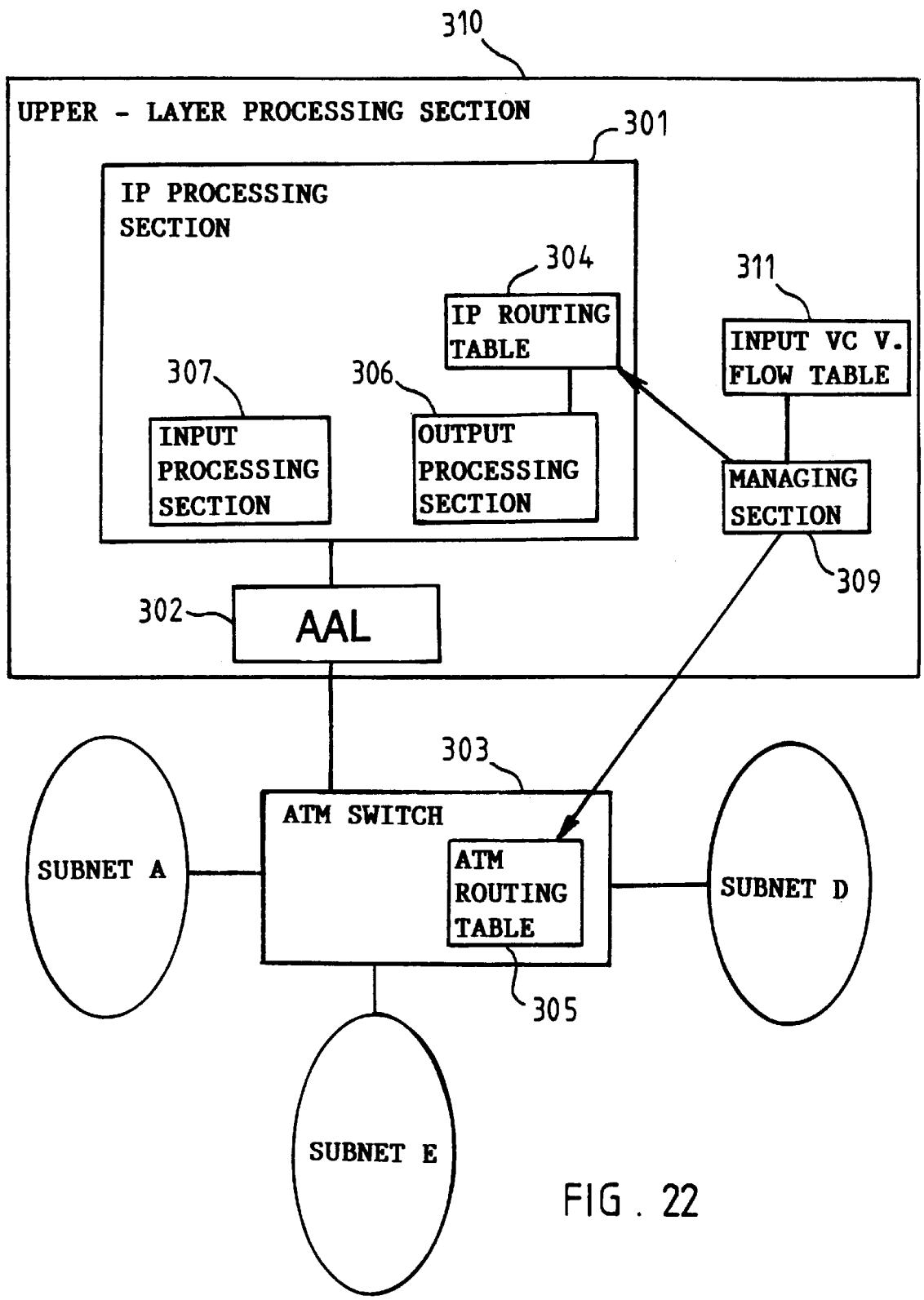
FIG. 22 is a functional block diagram showing an exemplary configuration of the CSR according to specific example 1 of embodiment 3.

FIG. 22 shows an example of a CSR configuration. IP processing section 301 performs network-layer processing; AAL processing section 302 converts ATM cells into AAL frames; and ATM switch 303 performs cell transfer. By copying input cells ATM switch 303 can output cells to a plurality of output I/Fs.

The upper layer processing section 310 includes IP processing section 301, AAL processing section 302, input VC v. flow table 311 and managing section 309. IP processing section 301 comprises input processing section 307, output processing section 306, and IP routing table 304, while ATM switch 303 comprises ATM routing table 305. The input VC v. flow table 311 stores information indicating a flow that are to be input from a given VC. Managing section 309 refers to, or creates an entry in, the IP routing table and the ATM routing table in accordance with the input VC v. flow table.

In the above example, the network-layer processing was described as being performed by the IP processing section. The network-layer processing, however, can be performed in a similar way also in a case of another network-layer protocol (e.g., IPX).

(Embodiment 3, Specific example 1)

The operation of the CSR in the case where the CSR does not receive the duplicated packets, as in embodiment 1, will be described. Packets can flow only in the directly linked VCs when the input VC and the output VC are directly linked by the CSR. Thus, packets do not reach receiving parties that are not directly linked, even though these are participating in the multicast communication. This specific example provides a method of overcoming this problem while the CSR transfers received packets downstream such that packets are not duplicated.

Figure 23:
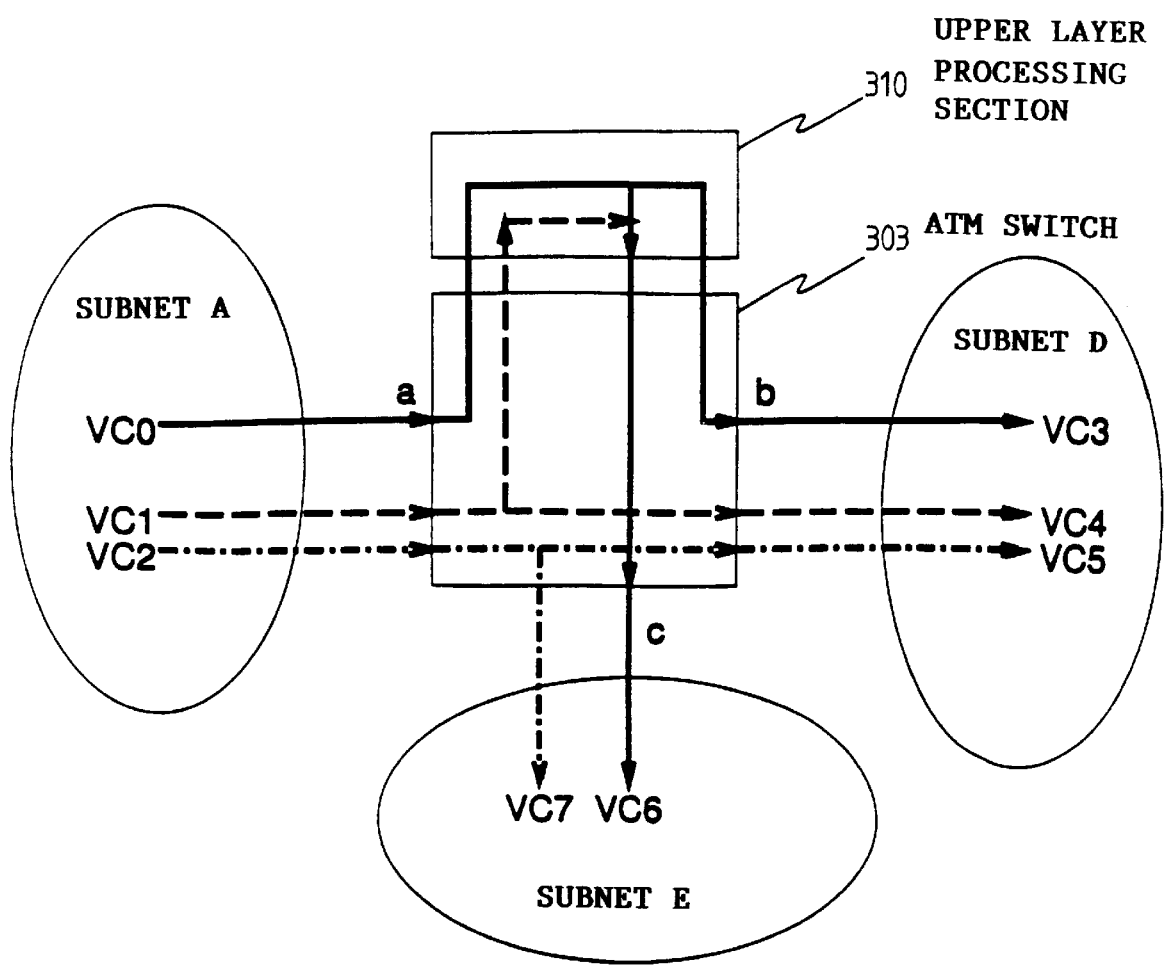
FIG. 23 is an exemplary VC set-up diagram in the CSR according to specific example 1 of embodiment 3.

A case where the router R3 of FIG. 1 is a CSR will now be described. FIG. 23 is a view of VC set-up where R3 is placed at the center. The arrows of FIG. 23 are for purposes of illustration only, to show communication flow from subnet A. Information may also flow from the other subnets.

Packets arrive at the CSR from subnet A through three VCs: VC0, VC1 and VC2. These VCs are set up so as to allow the following packets to flow. On VC1, packets of source address S, destination address G1, and destination port 1 flow. On VC0, packets of source address S, destination address G1, but of destination port other than 1, flow. On VC2, packets of source address S and destination address G2 flow. Hereinafter, the set consisting of source address S, destination address G1 and destination port 1 is represented as (S, G1, 1).

In this example, nodes participating in destination address G1 and G2 are present on subnet D and subnet E. This means that packets received from subnet A must be sent to subnet D and subnet E. Now consider a case where participants of subnet D have requested a specified QOS for the flow of (S, G1, 1) but the participants of subnet E have not made any request in regard to this flow.

ATM cells arriving from VC0 are handed over to the upper-layer processing section, to assemble cells into packets and to determine an output I/F. These packets are divided into cells, and then sent onto VC3 and VC6. Cells arriving from VC1 are transferred onto directly linked VC4, and also handed over to the upper-layer processing section to be sent onto VC6. Cells received from VC2 are transferred onto directly linked VC5 and VC7.

That is, if a direct link is formed to only some (not all) of the receiving parties, the cells are copied by the ATM switch to be handed over to the upper-layer processing section. In this way, packets can be sent to participants for whom a direct linked is not formed.

The above operation will be described in detail, with reference to flowcharts of FIG. 24 and FIG. 25, the IP routing table of FIG. 27 (304 in FIG. 22), and the ATM routing table of FIG. 26 (305 of FIG. 22).

Figure 24:
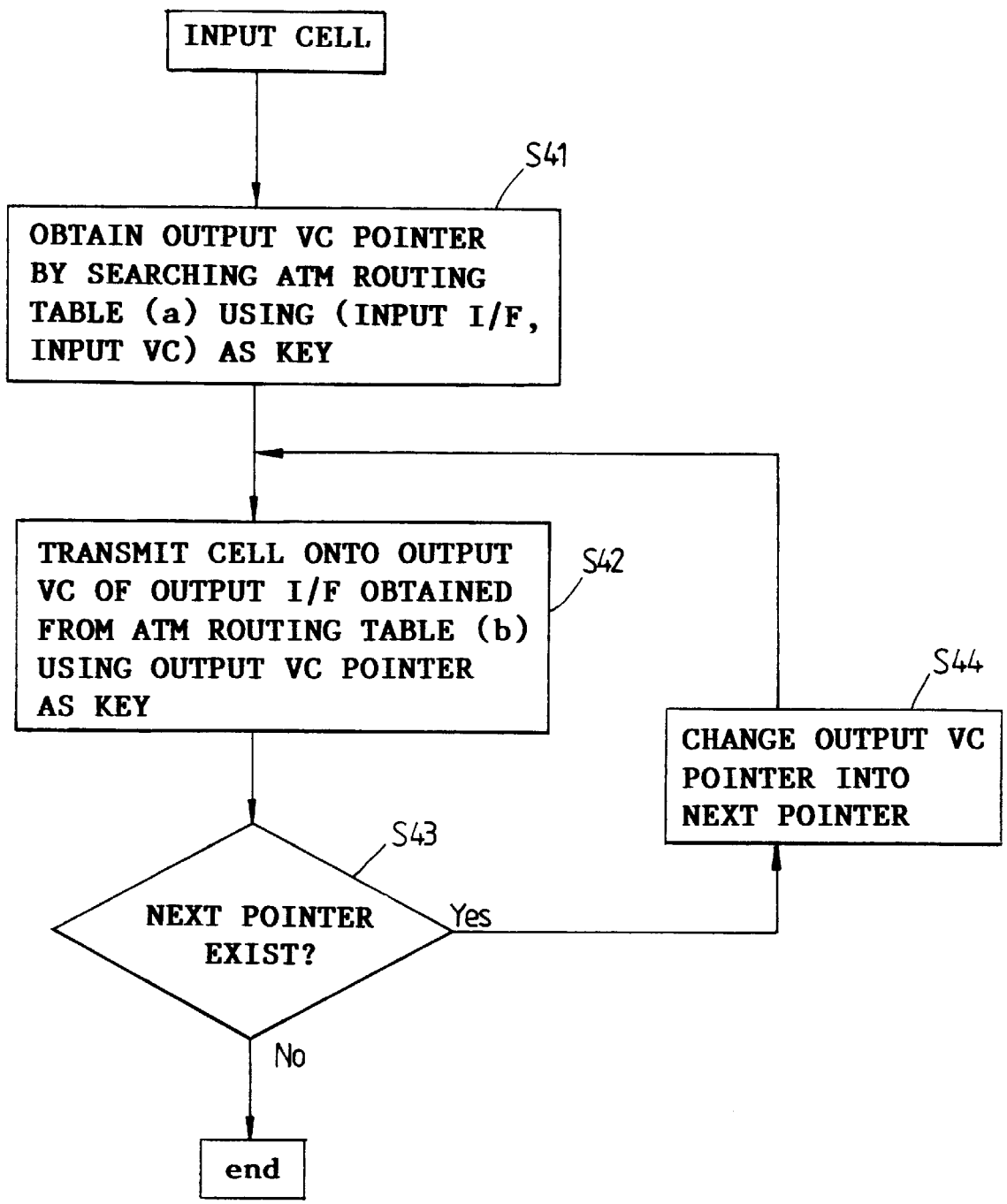
FIG. 24 is a flow chart showing an exemplary operation of the ATM switch according to embodiments 3 to 5.
Figure 25:
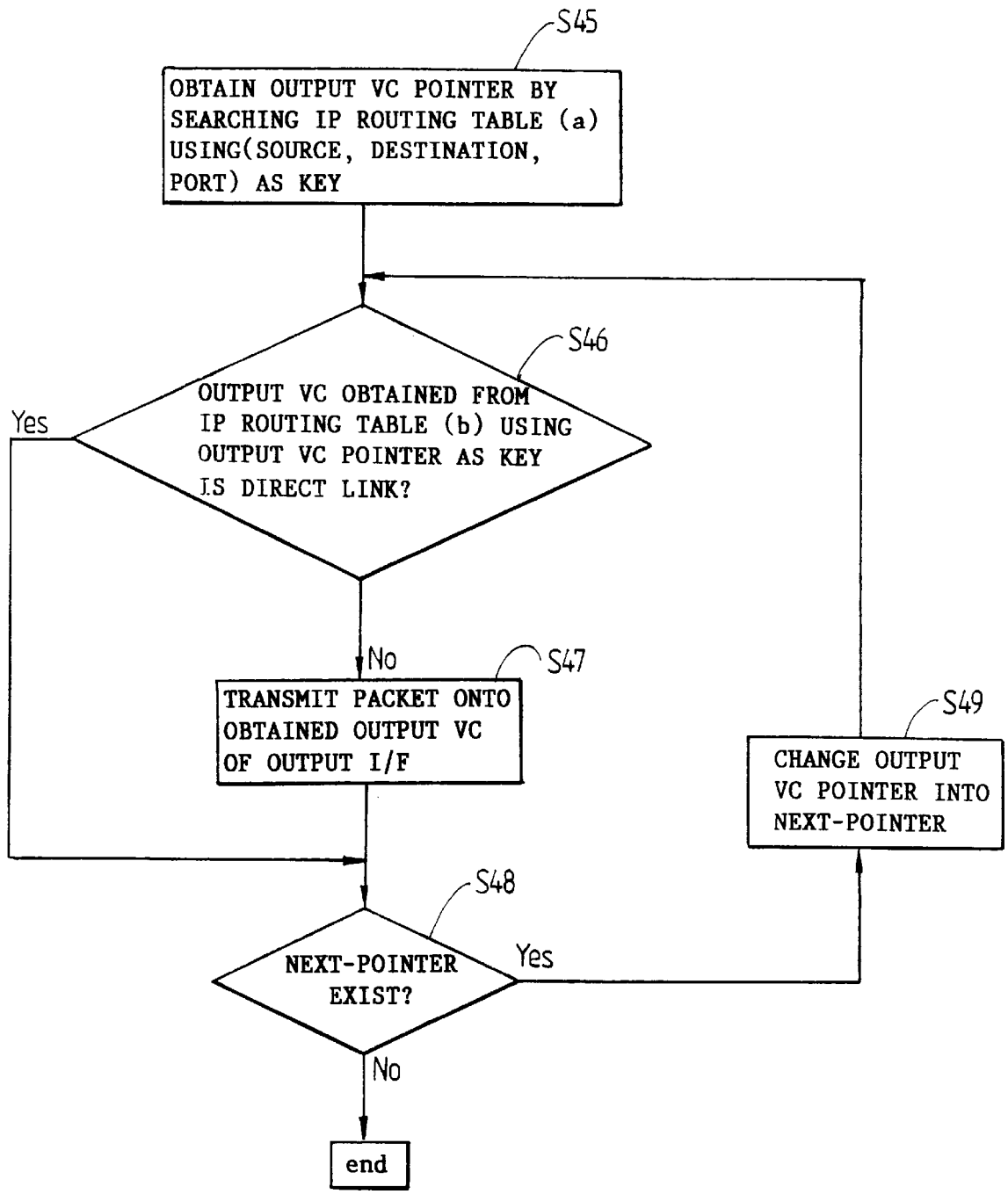
FIG. 25 is a flow chart showing an exemplary operation of the IP processing section according to specific examples 1 and 3 of embodiment 3.

When the packets (S, G1, 2) from VC0 arrive as ATM cells, the ATM switch outputs cells in accordance with the flowchart of FIG. 24. First of all, ATM routing table (a) of FIG. 26 is searched (S41) to obtain an output VC pointer, using the input I/F and input VC as a key.

VC0 is input I/F=a, input VC=VC0, so the output VC pointer is "1." The entry of address "1" in ATM routing table (b) of FIG. 26 is found based on the output VC pointer. The entry indicates output I/F=upper layer, so the cells are handed over to the upper-layer processing section (S42). Since there is no further pointer in ATM routing table (b) of FIG. 26 (S43: NO), processing terminates at this point.

The cells that are handed over to the upper-layer processing section are assembled into packets. These packets are transferred in accordance with the flowchart of FIG. 25.

When a packet (S, G1, 2) arrives, IP routing table (a) of FIG. 27 is searched by the "best-match" method (S45) using (S, G1, 2) as a key. Matching is achieved at the entry (S, G1, –), so output VC pointer "1" is obtained. Using output VC pointer "1" as the address, the entry of output I/F=b, output VC=VC3, direct-link=no, and next-pointer "2" is found in IP routing table (b) of FIG. 27.

Since direct-link=no (S46: No), the packet is sent onto output I/F=b, output VC=VC3 (S47).

Since the next pointer is "2" (S48), by looking at address "2" of IP routing table (b) of FIG. 27 (S49), the same operation as above is performed. Namely, the packet is sent also onto output I/F=c, output VC=VC6 (S47). Since the next pointer is "X," packet transfer is completed.

Now, a case where packets (S, G1, 1) are received from VC1 is described below. The methods of transfer at the ATM switch and of transfer in the upper-layer processing section are as described above regarding VC0. When cells arrive from VC1, by referring to the ATM routing table of FIG. 26, the ATM switch sends the packet to the upper layer as well as onto output I/F=b, output VC=VC4. This operation makes it possible to ensure that packets will not fail to reach even participants for whom the VCs are not directly linked, by copying cells to be transferred through the directly linked VC and by handing the cells over to the upper layer.

When the upper-layer processing section searches IP routing table (a) of FIG. 27 by "best-match" using (S, G1, 1) as a key, output VC pointer "3" is obtained and so, from IP routing table (b) of FIG. 27, the entry of output I/F=b, output VC=VC4, next-pointer "4", and direct-link=yes is found.

Since direct-link=yes (S46: Yes), the next pointer "4" is tried (S48) without outputting the packet to VC4. Then, the entry of output I/F=c, output VC=VC6, and direct link=no is found, so the packet is sent onto VC6 (S47). As a result, packets (S, G1, 1) will be sent even to participants (corresponding to VC6) that are not directly linked.

If cells arrives from VC2, the cells are directly transferred output I/F=b, output VC=VC5 and output I/F=c, output VC=VC7, by referring only to the ATM routing table of FIG. 26. In this case, packets do not pass through the upper-layer processing section. This is because there is no participant node not directly linked regarding packets of source address S, destination address G2 (there is no need to copy the cells in order to give the packets to the upper layer).

According to the above method, the direct linking of dedicated VCs in multicast packet transfer can be practiced such that the packets can reliably be sent to all the participants of multicast group.

Implementing the above method may require determining whether the ATM switch is to copy the cells and hand them over to the upper-layer processing section. This is determined by managing section 309 of FIG. 22 referring to IP routing table 304 of FIG. 27 and input VC v. flow table 311 of FIG. 28, to set up ATM routing table 305.

Managing section 309 can identify the flow on an input VC, with reference to the input VC v. flow table. If, on looking up this flow in the IP routing table, it is found that none of its output VCs are directly linked, or, alternatively, that all of its output VCs are directly linked, it is determined that there is no need for the ATM switch to copy the cells for the upper-layer processing section. It is determined that there is a need for the ATM switch to copy the cells for the upper-layer processing section if some of the output VCs are directly linked while others are not directly linked. The managing section sets up the ATM routing table on the basis of this decision.

Specifically, it can be seen from FIG. 28 that packets (S, G1, 1) are flowing in VC1. Searching the tables of FIG. 27 using (S, G1, 1) as a key, it is found from IP routing table (b) that there is one directly linked VC (VC4) and one VC that is not directly linked (VC6). It is therefore determined that the ATM switch needs to perform copying regarding VC1 to hand the cells over to the upper-layer processing section.

It can be seen from FIG. 28 that packets (S, G2, −) are flowing in VC2, so, using this as a key to search the tables of FIG. 27, it is found that both the VCs (VC5 and VC7) are directly linked. It is therefore determined that it is not necessary for cells to be copied to be handed over to the upper-layer processing section.

Using information obtained in this way, ATM routing table of FIG. 26 is set up. In the ATM routing table, VC0 is the default VC, so this is simply to be handed over to the upper layer. The correspondence relationship such that VC1 is directly linked to VC4 is stored, and the correspondence relationship such that VC2 is directly linked to VC5 and VC7 is stored. When, regarding VC1, it is found that there is need to copy cells for the upper layer, the next pointer of VC4 is set and the upper layer is written in the entry indicated by the next pointer.

Referring to FIG. 23, if there is a node in subnet F (not shown) that participates also in destination address G2 and VC8 for that node is not directly linked with VC2, packets (S, G2, −) can be transferred onto VC8 also by handing them over to the upper layer by copying cells from VC2 in the same way as above.

The characteristic features of this example may be summarized as follows. In order to transfer packets to a plurality of destination nodes in multicast communication, a router transfers packets received from a first node (subnet A) belonging to one logical network to a plurality of second nodes (subnets D and E) belonging to another logical network. The router stores a correspondence relationship between a first virtual connection (VC1) that is capable of receiving packets from the first node and a second virtual connection (VC4) that is capable of sending packets to a specified node (subnet D) of the plurality of second nodes, and transfers packets in accordance with this correspondence relationship, bypassing a network-layer processing (i.e., transfers packets by direct linking). Also, if it is determined that one or more (subnet E) of the plurality of second nodes other than the specified node will receive none or not all of the packets destined for the destination nodes due to the direct linking, the router transfers packets received from the first virtual connection (VC1) to the aforesaid node (subnet E) other than the specified node by copying the received packets for the network-layer processing.

More specifically, it is determined that the aforesaid node will not receive packets, when, apart from the second virtual connection (VC4) whose correspondence relationship with the first virtual connection (VC1) is stored corresponding to a packet flow (S, G1, 1) to be received from the first virtual connection, there is a third virtual connection (VC6) corresponding to that packet flow whose correspondence relationship with the first virtual connection is not stored.

In contrast, the above determination is not effected, when there is no third virtual connection other than the second virtual connections (VC5 and VC7) whose correspondence relationships with the first virtual connection (VC2) are stored corresponding to a packet flow (S, G2, −) to be received from the first virtual connection.

Consequently, the received packets are copied if necessary, one copy being transferred through the direct link toward some of the destination nodes while the other copy is handed over to the network layer to be transferred toward other of the destination nodes, and thus packets can be received by all the nodes participating in the multicast group.

(Embodiment 3, Specific example 2)

In this specific example, the operation of the CSR in the case where the CSR receives the duplicated packets, as in embodiment 2, but eliminates the problem of chained duplication while ensuring that all the participants will not fail to receive the multicast packets, will be described.

FIG. 29 shows another exemplary CSR configuration. The difference from FIG. 22 is that packet discarding table 308 is added in IP processing section 301. Input processing section 307 checks the packet discarding table to avoid duplicated processing.

Figure 30:
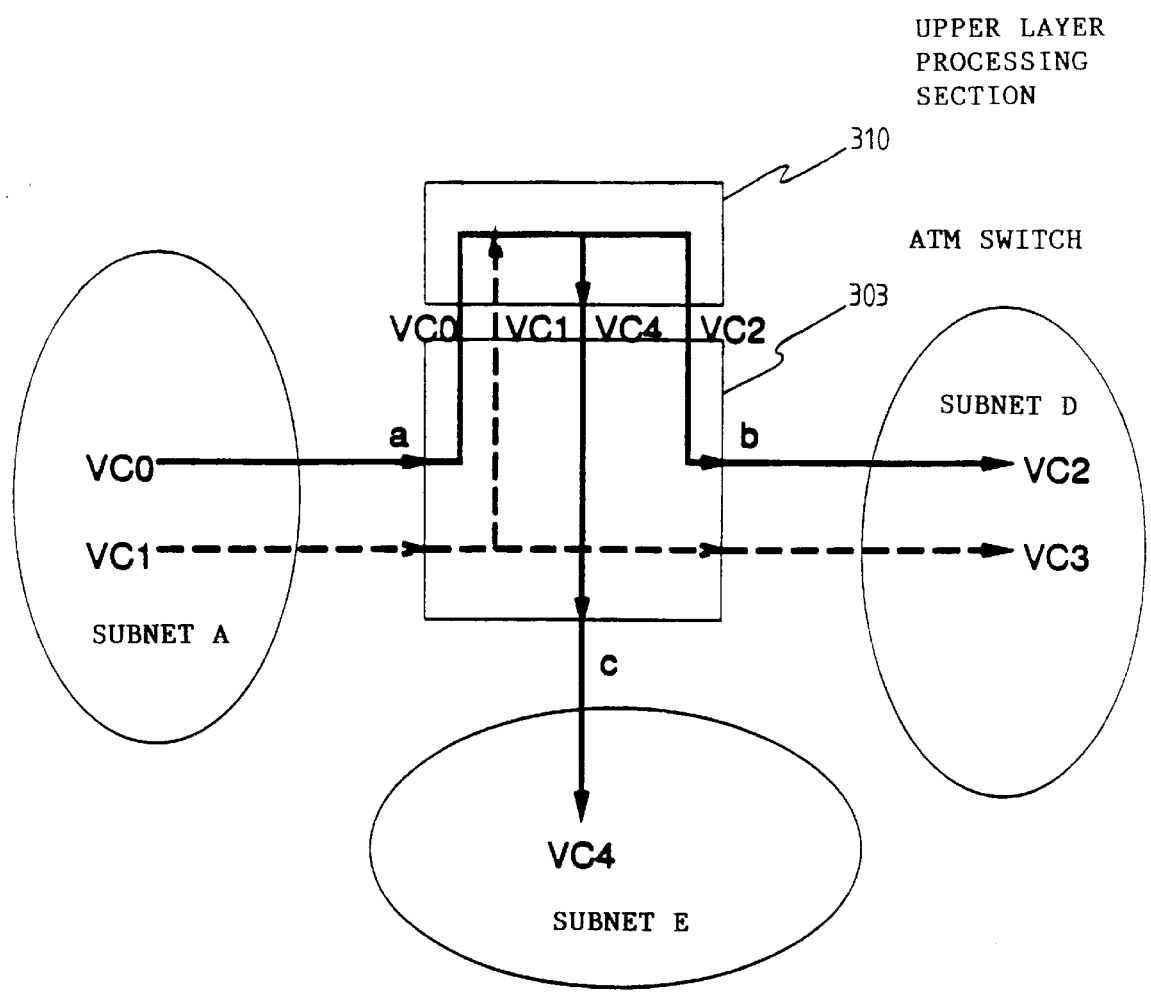
FIG. 30 is an exemplary VC set-up diagram in the CSR according to specific example 2 of embodiment 3.

A case where the router R3 of FIG. 1 is a CSR will be described. FIG. 30 is a view of VC set-up where R3 is placed at the center. The I/F of the ATM switch with subnet A is called a, the I/F with subnet B is called b, and the I/F with subnet C is called c. The I/F of the ATM switch with the upper-layer processing section is called "upper layer".

The ATM routing table of R3 is shown in FIG. 31, the IP routing table is shown in FIG. 32, and the packet discarding table is shown in FIG. 33.

Now consider a case where packets of destination address G are transferred from VC0 (default VC) and packets (S, G, 1) are transferred from VC1 (dedicated VC).

When cells of packets (S, G, 1) arrived from VC0, these cells are handed over to the upper layer through VC0 by operation of the ATM switch in accordance with the flow-chart of FIG. 24, referring to the ATM routing table of FIG. 31, and assembled into packets by the upper-layer processing section. Input processing section 307 of the upper-layer processing section decides whether or not packets (S, G, 1) are to be discarded by referring to the packet discarding table of FIG. 33. The packet discarding table instructs that packets (S, G, 1) whose input VC is other than VC1 are to be discarded. These packets are therefore discarded and processing is terminated.

When cells of packets (S, G, 2) have arrived from VC0, these cells are handed over to the upper-layer processing section, as described above, and the input processing section checks the packet discarding table. The packet discarding table contains no entry for (S, G, 2), so these packets are not discarded.

In order to output these packets, the packet output processing section operates, referring to the IP routing table of FIG. 32. This output processing is in accordance with the flowchart shown in FIG. 5. It can be seen by searching the IP routing table by "best-match" that these packets are to be output to output I/F="upper layer", output VC=VC2 and VC4.

After these packets are divided into cells and output onto these VCs, the ATM switch transfers the cells from VC2 onto output I/F=b, output VC=VC2, and transfers the cells from VC4 onto output I/F=c, output VC=VC4, in accordance with the flowchart of FIG. 24, referring to the ATM routing tables of FIG. 31.

When cells of packets (S, G, 1) arrived from VC1, the ATM switch transfers these cells onto VC3 directly, and also copies these cells to hand the copied cells over to the upper-layer processing section, in accordance with the flowchart of FIG. 24, referring to the ATM routing table of FIG. 31.

Then, the input processing section searches the packet discarding table using (S, G, 1) as a key. The entry that is found states that only packets whose input VC is other than VC1 are to be discarded, so these packets are not discarded. These packets are therefore output by the output processing section referring to the IP routing table of FIG. 32. This output method is as was described in the case where packets (S, G, 2) were input from VC0.

In this specific example, when a direct link is formed, cells arriving from the upstream dedicated VC (VC1) are transferred onto the directly linked downstream dedicated VC (VC3), and also copied by the ATM switch so as to be handed over to the upper layer (for transfer to VC2 and VC4). In a case where cells arriving from an upstream VC which are not directly linked with a downstream VC, these cells are handed over as normally hop-by-hop transfer to the upper layer (in this case, cells from VC1 are transferred onto VC2, VC3 and VC4 by ATM and IP routing tables different from those shown in FIG. 31 and FIG. 32). That is, in this specific example, cells coming from a dedicated VC are handed over from the ATM switch to the upper layer irrespective of whether or not the dedicated VC is directly linked with a downstream VC. Since the upper-layer processing section transfers the packets onto a downstream VC that is not directly linked, the destination node for which a direct link is not formed can also receive the multicast packets.

Also, since the upper-layer processing section discards unnecessary ones of the duplicated packets and does not output any packets onto the directly linked downstream dedicated VC, improper duplication does not occur. When R3 is notified that the packets flowing through VC1 are (S, G, 1) by S, R3 performs the set-up of the packet discarding table. Specifically, managing section 309 of FIG. 29 creates an entry in input VC v. flow table 311 of FIG. 33, and also creates an entry in packet discarding table 308 of FIG. 33 to the effect that packets (S, G, 1) arriving from a VC other than VC1 are to be discarded.

Also, managing section 309 alters the ATM and IP routing tables to perform changeover between directly-linked transfer and hop-by-hop transfer, by using a direct-link management table, not shown in FIG. 29, as in embodiment 4 that will be described later. The input VC v. flow table 311 of FIG. 29 constitutes a part of the direct-link management table.

Alternatively, the packet output processing of this embodiment can be implemented by the method of embodiment 2 described above. Specifically, output processing is performed as shown in the flowchart of FIG. 15 (non-"best-match" searching method). This may be done by adding an entry indicating that the output VC pointer of packets (S, G, 1) is "3" to the IP routing table of FIG. 32(a), and by writing output I/F="upper layer", output VC=VC4, and next-pointer "X" at address "3" of FIG. 32(b).

The characteristic features of this example may be summarized as follows. In order to transfer packets to a plurality of destination nodes in multicast communication, a router transfers packets received from a first node (subnet A) belonging to one logical network to a second node (subnet D) belonging to another logical network. When the router receives some or all of the packets destined for the destination nodes in duplicated fashion from the first node through first and second virtual connections (VC0 and VC1), the router selects the duplicated packets from the packets received through the first virtual connection (VC0) and discard the selected packets. If a correspondence relationship between the second virtual connection (VC1) and a third virtual connection (VC3) that is capable of sending packets to the second node is stored in order to transfer packets by direct linking, the router transfers packets received through the second virtual connection (VC1) to the second node through a fourth virtual connection (VC2) other than the third virtual connection by copying the received packets for the network-layer processing. In contrast, if the second virtual connection is not directly linked, the router does not copy the packets.

(Embodiment 3, Specific example 3)

This specific example provides another method in the case where the CSR receives the duplicated packets, as in embodiment 2, but eliminates the problem of chained duplication while ensuring that all the participants will not fail to receive the multicast packets.

If an upstream dedicated VC coming into the CSR is directly connected to one or more downstream dedicated VC, packets received from a default VC are not discarded. If the upstream dedicated VC is not directly linked with any downstream VC, packets received from the default VC are discarded in the input processing section as far as the packets are identical to the packet flow flowing in the dedicated VC.

Figure 34:
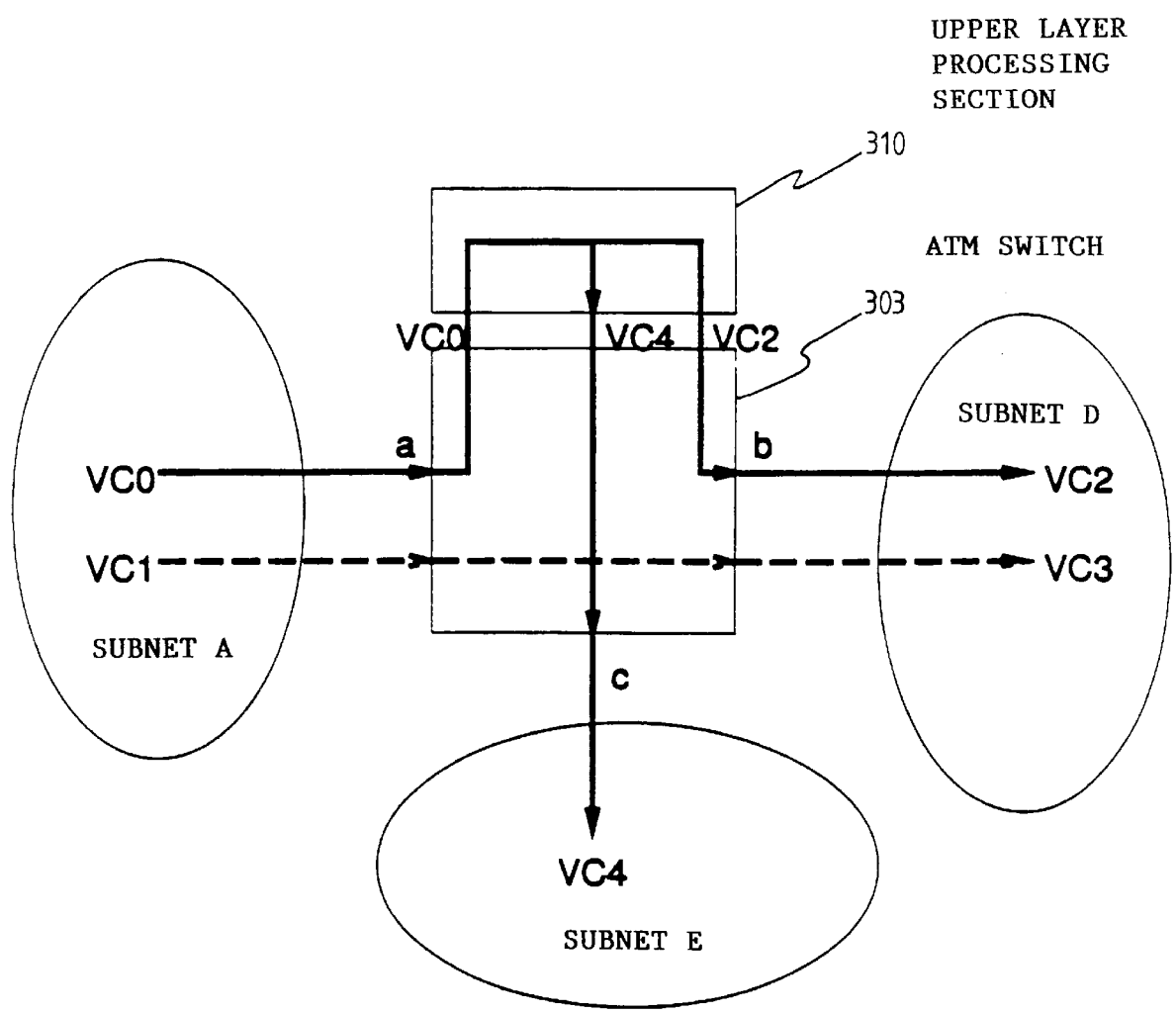
FIG. 34 is an exemplary VC set-up diagram in the CSR in a given condition according to specific example 3 of embodiment 3.

The case where the dedicated VC is directly linked will now be described with reference to FIG. 34. Input processing is performed as in the case of specific example 2 described above, and output processing is performed by "best-match" searching in accordance with the flowchart of FIG. 25. FIG. 35 shows the IP routing table (FIG. 35(a) and FIG. 35(b)), packet discarding table (FIG. 35(c)), and input VC v. flow table (FIG. 35(d)) in this case. Since the input VC v. flow table indicates that VC1 is directly linked, nothing is written in the packet discarding table. Received packets are therefore not discarded. The received packets are sent to VC2 and VC4 in accordance with the flowchart of FIG. 25.

Figure 36:
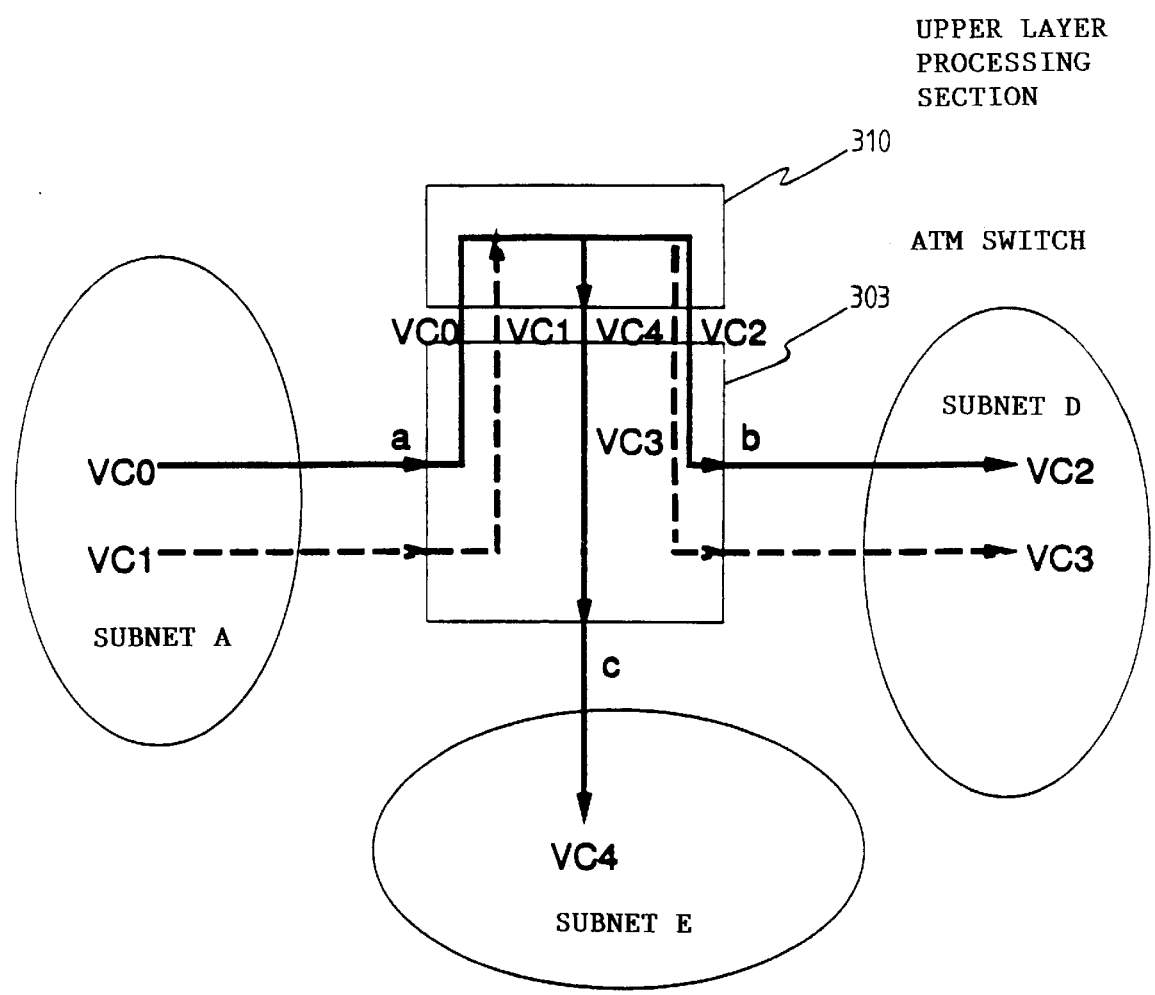
FIG. 36 is an exemplary VC set-up diagram in the CSR in another condition according to specific example 3 of embodiment 3.

In contrast, FIG. 36 illustrates the case where the dedicated VC is not directly linked. FIG. 37 shows the IP routing table (FIG. 37(a) and FIG. 37(b)), packet discarding table (FIG. 37(c)), and input VC v. flow table (FIG. 37(d)) in this case. Since the input VC v. flow table indicates that VC1 is not directly connected, an entry is made in the packet discarding table to the effect that any packets (S, G, 1) except those arriving from VC1 (which is the dedicated VC) are to be discarded. Thus, packets (S, G, 1) are discarded if they come from VC0, but are subjected to output processing (not discarded) if they come from VC1. The output processing is in accordance with the flowchart of FIG. 25. Packets (S, G, 2) are output to VC2 and VC4, and packets (S, G, 1) are output to VC2, VC3 and VC4.

The CSR records the input VC and flow in the input VC v. flow table, when an upstream node notifies the CSR of a specified flow flowing through a given VC, and changes the status in the direct-link field of the corresponding entry, when a direct link is formed or released. The managing section of FIG. 29 alters the packet discarding table, when it finds that the direct-link field of the input VC v. flow table is changed from yes to no, or the reverse.

Also, the managing section of FIG. 29 alters the ATM and IP routing tables in the case of changeover between directly-linked transfer and hop-by-hop transfer, using a direct-link management table, a part of which is the input VC v. flow table, as shown in embodiment 4 that will be described later. Although not shown in FIG. 35 or FIG. 37, the contents of the ATM routing table also is altered such that, if there is no direct link, cells coming from VC0 and cells coming from VC1 are both transferred to the upper layer, whereas, if VC1 is directly linked with VC3, cells coming from VC0 are transferred to the upper layer while cells coming from VC1 are transferred onto VC3.

The characteristic features of this example may be summarized as follows. In order to transfer packets to a plurality of destination nodes in multicast communication, a router transfers packets received from a first node (subnet A) belonging to one logical network to a second node (subnet D) belonging to another logical network. The router receives some or all of the packets destined for the destination nodes in duplicated fashion from the first node through first and second virtual connections (VC0 and VC1). If a correspondence relationship between the second virtual connection (VC1) and a third virtual connection (VC3) that is capable of sending packets to the second node is stored in order to transfer packets by direct linking, the router transfers packets received through the first virtual connection (VC0) to the second node through a fourth virtual connection (VC2) other than the third virtual connection by processing the packets at the network layer. In contrast, if the second virtual connection is not directly linked, the router selects the duplicated packets from the packets received through the first virtual connection (VC0) and discard the selected packets.

It can be said that embodiment 3/specific example 2 is a method of discarding packets necessarily and copying for the upper layer if necessary while embodiment 3/specific example 3 is a method of discarding packets only in a case where the upper-layer processing section does not need the packets.

It should be noted that in embodiment 3 packets transferred through the directly-linked virtual connection can be all the packets destined for the destination nodes, or can be some (not all) of the packets, which belongs to a specified flow. The specified flow may be a flow for which a specified QOS is to be provided.

In the latter case, the characteristic features of the above examples is applied to the packets belonging to the specified flow, while packets destined for the destination nodes but not belonging to the specified flow are transferred using a default virtual connection which is not directly linked. The latter case includes the method (corresponding to embodiment 3/specific example 1, embodiment 1) of transmitting packets belonging to the specified flow onto a virtual connection capable of being directly linked (i.e., dedicated VC) and transmitting other packets destined for the destination nodes onto a virtual connection that is not directly linked (i.e., default VC), and the method (corresponding to embodiment 3/specific examples 2 and 3, embodiment 2) of transmitting packets belonging to the specified flow onto a dedicated VC and transmitting all the packets destined for the destination nodes onto a default VC.

Also, when a dedicated VC is set up in response to a request originating from one of the destination nodes, a dedicated VC may be set up only between nodes on the route from source node to the destination node that originally sent this request, or, alternatively, a dedicated (point-multipoint) VC may be set up to all the next-hop nodes connected to one output interface when one of the next-hop node is on the route to the destination node that originally sent this request.

(Embodiment 4)

When multicast packets are transferred by a CSR, it may happen that a plurality of output VCs exists corresponding to one input flow. In this case, the load on the upper-layer processing section can be reduced by copying cells using the copy function of the ATM switch.

Figure 38:
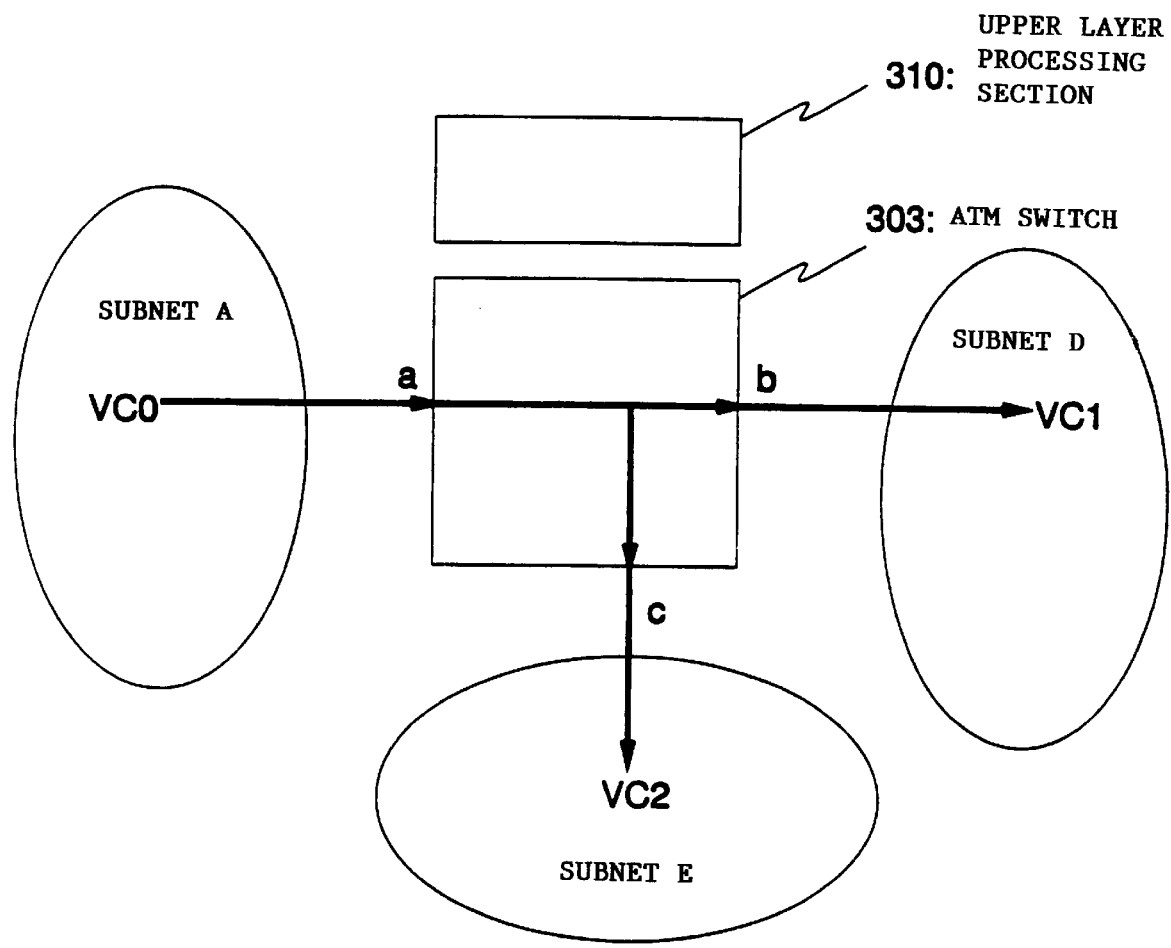
FIG. 38 is an exemplary VC set-up diagram in the CSR according to embodiment 4.

The configuration of the router of this embodiment is similar to FIG. 22 or FIG. 29. Now consider a case where, as in FIG. 38, the input VC is VC0 and output VCs are VC1 and VC2. Input VC0 is a VC for transferring packets of source address S, destination address G. VC1 and VC2 are VCs for sending packets of source address S, destination address G. The direct-link management table of FIG. 39 is used to manage this information.

The direct-link management table is used by the routers of embodiments 3 through 5 in a similar way as in this embodiment, in order to set up the ATM routing table such as to link directly the input VC and output VCs that transfer the same flow.

By setting up an ATM routing table in the switch as in FIG. 40, referring to the direct-link management table, cells arriving from VC0 are transferred onto VC1 and VC2 without being handed over to the upper-layer processing section. This transfer is implemented by operation of the ATM switch in accordance with the flowchart of FIG. 24. The load on the upper-layer processing section is thereby lightened.

The characteristic features of this embodiment may be summarized as follows. In order to transfer packets to a plurality of destination nodes in multicast communication, a router transfers packets received from a first node (subnet A) belonging to one logical network to second and third nodes (subnets D and E) belonging to other logical networks. The router stores a correspondence relationship between a first virtual connection (VC0) capable of receiving packets from the first node and a second virtual connection (VC1) capable of sending packets to the second node in order to transfer packets belonging to a given flow to the second node, and furthermore stores a correspondence relationship of the first virtual connection and a third virtual connection (VC2) that is capable of sending packets to the third node in order to transfer packets belonging to the flow to the third node. Then, the router transfers packets received through the first virtual connection in accordance with a plurality of stored correspondence relationships onto the second and third virtual connections with no or only a part of the network-layer processing.

(Embodiment 5)

When transferring multicast packets by a router having an ATM switch (which may or may not be provided with a directly-linked transfer function like the CSR), the load on the upper-layer processing section can be lightened by copying the packets in the ATM switch instead of copying the packets in the upper-layer processing section, to transfer the identical packets to a plurality of output VCs.

Figure 41:
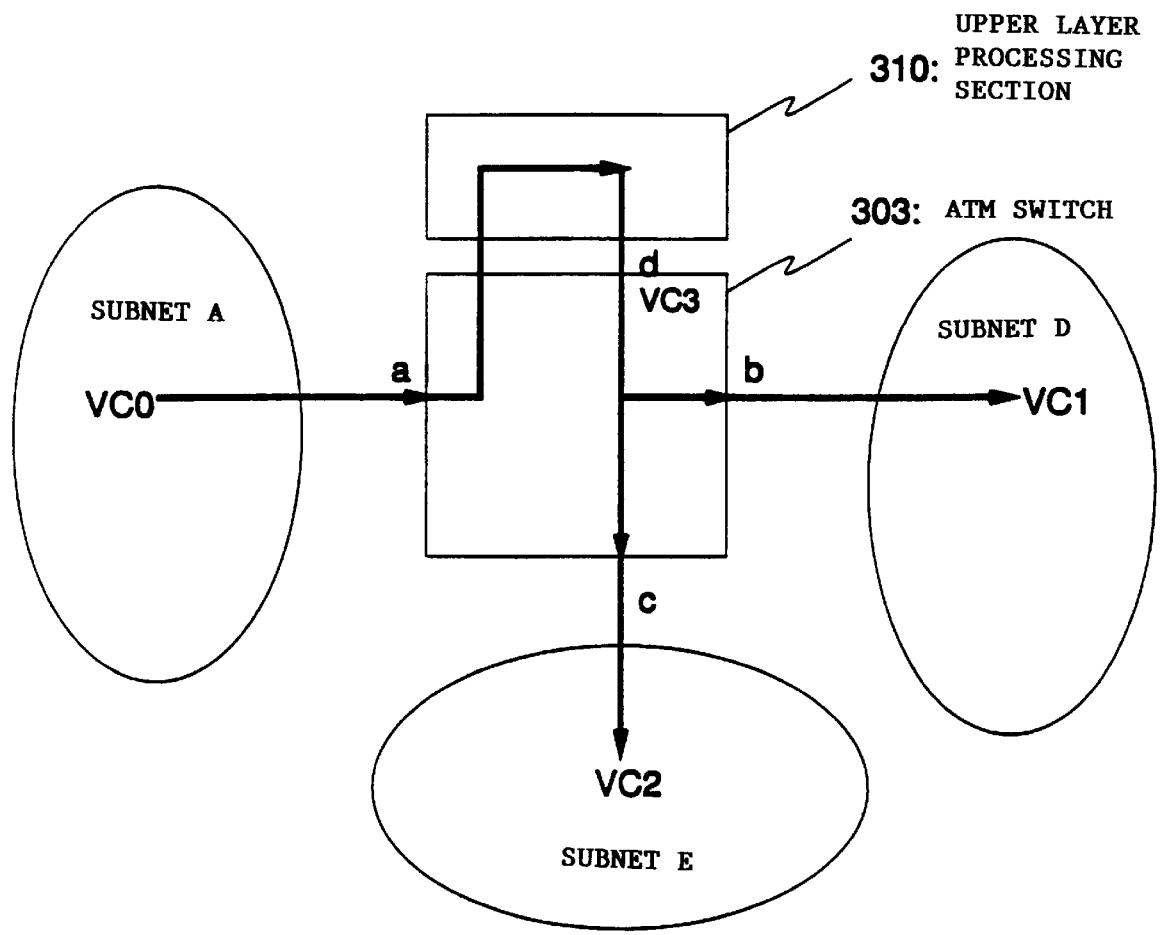
FIG. 41 is an exemplary VC set-up diagram in a router according to embodiment 5.

The configuration of the router of this embodiment is similar to FIG. 22 or FIG. 29. Now consider a case where, as in FIG. 41, cells of source address S, destination address G are received from VC0. The ATM switch hands the received cells over to the upper-level processing section in accordance with the flowchart of FIG. 24. By searching the IP routing tables of FIG. 42 using the packet destination as a key, in accordance with the flowchart of FIG. 5, the upper-layer processing section discovers that output I/F=d, output VC=VC3. Then, the upper-layer processing section converts the packet to cells and outputs the cells to VC3. The ATM switch inputs these cells and sends them to both output I/F=c, output VC=VC1 and output I/F=b, output VC=VC2, referring to the ATM routing tables of FIG. 43, in accordance with the flowchart of FIG. 24.

The characteristic features of this embodiment may be summarized as follows. In order to transfer packets to a plurality of destination nodes in multicast communication, a router transfers packets received from a first node (subnet A) belonging to one logical network to second and third nodes (subnets D and E) belonging to other logical networks, through a switch that performs packet exchange using virtual connections. The router stores a correspondence relationship between a first virtual connection (VC3) for transferring packets belonging to a given flow and second and third virtual connections (VC1 and VC2) capable of sending packets to the second and third nodes respectively, in the switch. The router processes packets received from the first node (through VC0) at the network layer and outputs the processed packets to the switch using the first virtual connection (VC3). Then, the switch transfers these packets onto the second and third virtual connections (VC1 and VC2) in accordance with the stored correspondence relationship.

Consequently, the switch function in the node copies the packet so as to transmit it onto a plurality of virtual connections, thereby speeding up multicast packet transfer by lightening the load on the network layer.

In addition to those already mentioned above, persons of ordinary skill will realize that many modifications, variations and combinations of the above embodiments may be made without departing from the novel and advantageous features of the present invention.

Accordingly, all such modifications, variations and combinations are intended to be included within the scope of the appended claims.

The specification and examples are only exemplary. The following claims define the true scope and sprit of the invention.

What is claimed is:

1. A method of transferring a packet destined for a plurality of destination nodes in multicast communication from a first node belonging to one logical network to a plurality of second nodes, each of the plurality of second nodes belonging to another logical network different from said one logical network, comprising steps of:

storing a correspondence relationship between a first virtual connection for receiving a packet from the first node and a second virtual connection for transmitting the packet to a specified one of the plurality of second nodes;

copying a packet received through the first virtual connection when it is determined that one or more of the plurality of second nodes other than the specified one will not receive a packet destined for the plurality of destination nodes if the packet is transferred only in accordance with the stored correspondence relationship;

transferring one copy of the packet received through the first virtual connection onto the second virtual connection in accordance with the stored correspondence relationship; and transferring another copy of the packet received through the first virtual connection to said one or more of the plurality of second nodes other than the specified one.

2. The method according to claim 1, wherein the step of copying includes a substep of determining that said one or more of the plurality of second nodes other than the specified one will not receive a packet destined for the destination nodes if the packet is transferred only in accordance with the stored correspondence relationship, when a third virtual connection other than the second virtual connection for which a correspondence relationship with the first virtual connection is not stored exists corresponding to a flow to which a packet to be received through the first virtual connection belongs.

3. A method of transferring a packet destined for a plurality of destination nodes in multicast communication from a first node belonging to one logical network to a second node belonging to another logical network, comprising steps of:

receiving identical packets from the first node through first and second virtual connection;

storing a correspondence relationship between the second virtual connection and a third virtual connection for transmitting a packet to the second node;

transferring a packet received through the second virtual connection onto the third virtual connection in accordance with the stored correspondence relationship;

discarding an identical packet received through the first virtual connection, to prevent both of the identical packets received through the first and second virtual connections from being subjected to a transfer by analyzing information contained in a packet to be transferred; and transferring one of the identical packets received through the first and second virtual connections not being discarded onto a fourth virtual connection other than the third virtual connection by analyzing the information.

4. A method of transferring a packet destined for a plurality of destination nodes in multicast communication from a first node belonging to one logical network to a second node belonging to another logical network, comprising steps of:

receiving identical packets from the first node through first and second virtual connections;

discarding an identical packet received through the first virtual connection;

storing a correspondence relationship between the second virtual connection and a third virtual connection for transmitting a packet to the second node;

copying the packet received through the second virtual connection;

transferring one copy of the packet received through the second virtual connection onto the third virtual connection in accordance with the stored correspondence relationship; and transferring another copy of the packet received through the second virtual connection onto a fourth virtual connection other than the third virtual connection by analyzing a destination address contained in the packet.

5. A method of transferring a packet destined for a plurality of destination nodes in multicast communication from a first node belonging to one logical network to a second node belonging to another logical network, comprising steps of:

receiving identical packets from the first node through first and second virtual connections;

transferring a packet received through the second virtual connection onto a third virtual connection for transmitting a packet to the second node in accordance with a correspondence relationship, when the correspondence relationship between the second virtual connection and the third virtual connection is stored;

discarding an identical packet received through the first virtual connection, when the correspondence relationship is not stored; and transferring a packet received through the first virtual connection not being discarded onto a fourth virtual connection other than the third virtual connection by analyzing a destination address contained in the packet.

6. A node for transferring a packet destined for a plurality of destination nodes in multicast communication from a first node belonging to one logical network to a plurality of second nodes, each of the plurality of second nodes belonging to another logical network different from said one logical network, comprising:

a memory for storing a correspondence relationship between a first virtual connection for receiving a packet from the first node and a second virtual connection for transmitting the packet to a specified one of the plurality of second nodes;

first means for transferring a copy of a packet to one or more of the plurality of second nodes other than the specified one;

second means for transferring another copy of the packet destined for a plurality of destination nodes in multicast communication received through the first virtual connection onto the second virtual connection in accordance with the correspondence relationship, when the correspondence relationship is stored in the memory; and means for copying the packet received through the first virtual connection to hand over the packet to the first means, when it is determined that said one or more of the plurality of second nodes other than the specified one will not receive the packet destined for the plurality of destination nodes if the packet is transferred only by the second means.

7. The node according to claim 6, wherein the means for copying includes means for determining that the next-hop node will not receive the packet destined for the destination nodes if the packet is transferred only by the second means, when the packet destined for the destination nodes is received only through the first virtual connection and a third virtual connection other then the second virtual connection for which a correspondence relationship with the first virtual connection is not stored exists corresponding to a packet to be received through the first virtual connection.

8. The node according to claim 6, further comprising means for discarding a packet received through another virtual connection different from the first virtual connection, when the packet received through said another virtual connection is identical to the packet received through the first virtual connection, and wherein the means for copying includes means for determining whether or not the next-hop node will not receive the packet destined for the destination nodes if the packet is transferred only by the second means, depending on whether or not the correspondence relationship with the first virtual connection is stored in the memory.

9. A node for transferring a packet from a first node belonging to one logical network to a second node belonging to another logical network, comprising:

a memory for storing a correspondence relationship between a first virtual connection for receiving a packet from the first node and a second virtual connection for transmitting the packet to the second node;

first means for transferring a packet received from the first node to a next-hop node determined by analyzing information contained in the packet;

second means for transferring a packet received through the first virtual connection onto the second virtual connection in accordance with the stored correspondence relationship, when the correspondence relationship is stored in the memory; and means for discarding a packet received through another virtual connection different from the first virtual connection before the packet is handed over to the first means, when the packet received through said another virtual connection is identical to the packet received through the first virtual connection.

10. The node according to claim 9, wherein the means for discarding includes means for determining that the packet received through said another virtual connection should be discarded, when the correspondence relationship regarding the first virtual connection is not stored in the memory.

11. A method of transferring a packet destined for a plurality of destination nodes in multicast communication from a first node belonging to one logical network through a switch for exchanging the packet to a second node and a third node belonging to another logical network different from said one logical network, comprising steps of:

storing a correspondence relationship between a first virtual connection for transferring a packet and a second virtual connection for transmitting the packet to the second node and a third virtual connection for transmitting the packet to the third node;

transferring a packet received from the first node through the first virtual connection to the switch by analyzing a destination address contained in the packet; and transferring, by the switch, the packet received through the first virtual connection onto the second and third virtual connections in accordance with the stored correspondence relationship.

12. A node for transferring a packet from a first node belonging to one logical network to a second node and a third node belonging to another logical network different from said one logical network, comprising:

a memory for storing a correspondence relationship between a first virtual connection for transferring a packet and a second virtual connection for transmitting the packet to the second node and a third virtual connection for transmitting the packet to the third node;

a switch for transferring a packet received through the first virtual connection onto the second and third virtual connections in accordance with the stored correspondence relationship; and means for transferring a packet received from the first node to the switch through the first virtual connection by processing the packet at a network layer.

* * * * *